US007895262B2

(12) United States Patent
Nielsen et al.

(10) Patent No.: US 7,895,262 B2
(45) Date of Patent: Feb. 22, 2011

(54) WEB SERVICE APPLICATION PROTOCOL AND SOAP PROCESSING MODEL

(75) Inventors: Henrik Frystyk Nielsen, Hunts Point, WA (US); Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1729 days.

(21) Appl. No.: 10/856,399

(22) Filed: May 27, 2004

(65) Prior Publication Data

US 2005/0267772 A1    Dec. 1, 2005

(51) Int. Cl.
G06F 15/16 (2006.01)
G06F 12/00 (2006.01)
(52) U.S. Cl. ...................................... 709/203; 709/217
(58) Field of Classification Search .................. 709/203, 709/217–219, 223–226, 232, 250
See application file for complete search history.

(56) References Cited

U.S. PATENT DOCUMENTS

| 7,418,501 B2 * | 8/2008 | Davis et al. ................. 709/225 |
| 2002/0029256 A1 | 3/2002 | Zintel et al. ................. 709/218 |
| 2004/0064548 A1 * | 4/2004 | Adams et al. ............... 709/224 |
| 2005/0091386 A1 * | 4/2005 | Kuno et al. ................. 709/228 |

FOREIGN PATENT DOCUMENTS

EP    1 249 765    10/2002

OTHER PUBLICATIONS

Tuecke et al., Grid Service Specification—Draft 3, OGSI Working Group, Jul. 17, 2002, 47 pages.*
Medjahed et al., Composing Web services on the Semantic Web, The VLDB Journal, vol. 12 No. 4, Nov. 2003, pp. 333-351.*

* cited by examiner

Primary Examiner—Zarni Maung
(74) Attorney, Agent, or Firm—Workman Nydegger

(57) ABSTRACT

Described is a Web Services Application Protocol (WSAP) comprising a SOAP-based protocol that defines a web service application model based on a set of common message operations. WSAP provides a foundation for defining web services in terms of how they interact with each other. In WSAP, the behaviors of a service are each provided with an individual port, (e.g., URI), whereby the service's behaviors may be interacted with directly. WSAP also defines shared semantics for operations that identify what a message is, what the processing of message is, and how it affects the state/behavior of the receiver. The ordering of messages also provides context to what is occurring. As a result of the known characteristics of the operations and the ordering, an intermediary can process exchanged messages to add value to communications. A SOAP processing model defines composing multiple web services to run in parallel or sequentially.

30 Claims, 12 Drawing Sheets

WEB SERVICE APPLICATION PROTOCOL AND SOAP PROCESSING MODEL

FIELD OF THE INVENTION

The invention relates generally to computer systems and networks, and more particularly to web services.

BACKGROUND OF THE INVENTION

There are many types of computing services, resources and data that computer users and applications need to manage and otherwise access. Such resources and data include services and data maintained locally, and data maintained on corporate networks and other remotely accessible sites including intranets and the internet.

The concept of web services is generally directed to providing a computing service to clients via protocols and standards that are cross-platform in nature. In general, web services provides the basic tools for wiring the nodes of a distributed application together regardless of the type of platform on which the requesting client is running. As there are many different computing platforms, various platform-independent mechanisms and protocols that facilitate the exchange of network information are becoming commonplace in web services, including HTTP (HyperText Transfer Protocol), XML (extensible Markup Language), XML Schema, and SOAP (Simple Object Access Protocol) XML. Traditional web services, in which businesses, organizations, and other providers offer services to users and applications, are presently based on these standards. Moreover, as described in U.S. patent application Ser. No. 10/328,714, assigned to the assignee of the present invention, a web service can represent other types of resources, such as hardware devices, databases and the like.

Currently, the protocols by which web services exchange data with a client allow a client to send a message to a server port (e.g., URI) corresponding to the service and receive a message back at the client, in a manner agreed on according to a contract provided by the web service. However, one potential problem is that the client needs to send its messages through the service's URI, even though the service itself may be built from separate entities, whereby communication through the service's URI becomes a potential bottleneck.

Another problem with existing protocols is that any given message is not observable without intimate knowledge of the message format, except to basically note that the message exists. As a result, there is no way for an intermediary (e.g., another trusted service) to provide value to the message exchange, because the intermediary cannot be certain of the basic characteristics and/or purpose of the message.

What is needed is a mechanism by which clients and web services can securely and efficiently communicate with a web service, including the entities that make up a service, let allow intermediaries to add value to the communication.

SUMMARY OF THE INVENTION

Briefly, the present invention provides a method, system and mechanism including a web services application protocol (WSAP), that, among other things, formally represents the state and behavior of a service via a port, (e.g., URI), whereby the entities in a service may be contacted directly for interaction. In other words, unlike other protocols, WSAP describes the behaviors of a web service in a formalized manner, e.g., with each behavior of a service having its own port. The WSAP protocol also facilitates the usage of intermediaries by defining shared semantics on verbs, which identify what a message is, what the processing of message is, and how it affects the state/behavior of the receiver. Further, the ordering of messages and operations provides context to what is occurring.

In general, anytime the behaviors (or states) of a service's logical entities diverge, WSAP allows the service to give each behavior/state its own port, (e.g., an identity such as URI). In this way, the client can communicate directly with the logical entity within the service that controls the behavior/state. By way of example, consider a web service that provides access to a storage device such as a hard disk drive. Traditionally, after opening a file via a file system and receiving a file handle, to read and write data to the open file, the client would send the file handle to the file system. With WSAP, instead of returning a file handle, an arbiter service returns a URI to another logical entity (another service) of the web service that provides access to the behavior (the operation to perform) on the appropriate state (the data). In this example, with WSAP the client would receive a port for writing (e.g., using a suitable XML schema) to allowed locations on the storage medium itself, and another port for reading from the storage medium, without again going through the arbiter. Note that a read operation corresponds to one behavior of a storage medium, and thus may have a different URI from a write operation, which corresponds to another behavior. As can be appreciated, this model of data access is more efficient than going to a file system controller for each operation, particularly if the file system would otherwise be a bottleneck.

Moreover, in addition to the WSAP's clear interaction points in the form of ports that expose state and behavior, WSAP messages use shared semantics that describe what can be done on the interaction point. The semantics comprise shared message verbs that are separate from the (possibly proprietary) message details, allowing any arbitrary intermediary to observe, to a known extent, what is taking place, while leaving the message contents secure.

Message ordering can also serve to provide context to an observer. For example, each service may define which WSAP operations it accepts, and in which order. Further, the communication with each port ordinarily identifies the behavior that is being requested, since each behavior may be assigned its own port. These interaction patterns between service ports, which in fact may be maintained as a list of ports, provide a readily observable directory of what WSAP operations occurred, and in what order they occurred.

As a result, an intermediary can process exchanged messages to add value to communications. For example, when it is known from the requested operation type and/or known URI that a message will not change the state of a resource, an intermediary such as a cache service can safely read data from its own cache to satisfy the request, rather than invalidate the cache and pass the message (to another service) to access other storage media. Note that the intermediate cache service need only know the operation type from the protocol's semantics, or the URI if known to be to a read-only service, and not the internal contents of the message, which may remain secure, (and indeed may have been encrypted via another intermediary service). Examples of such read-like operations in WSAP in which no state changes are involved include operations referred to using the shared semantics of QUERY or GET. Such operations each have the characteristic of being safe, essentially meaning read-only access is sufficient to satisfy the operation request, and idempotent, essentially meaning that the same operation can be repeated indefinitely without changing state. Note that a cache is only one example of such an intermediary, and an intermediary can be any other service as appropriate, e.g., a load balancer, data compressor, replication service, encryption/decryption mechanism, and so forth.

Moreover, because of behaviors having their own ports, a SOAP processing model is provided that defines how to compose multiple web services to run in parallel or sequentially. The model allows the implementation of several services, such as the SOAP-aware serializer, to serialize or deserialize the header and body of a given SOAP message concurrently. This allows services that depend upon parts of the SOAP envelope to unblock whenever a header that a service cares about is available. Note that when two communicating parties are co-located, e.g., on the same device, the forwarding and transport services do not serialize the SOAP envelope for performance reasons.

Other advantages will become apparent from the following detailed description when taken in conjunction with the drawings, in which:

DETAILED DESCRIPTION

Exemplary Operating Environment

Figure 1:
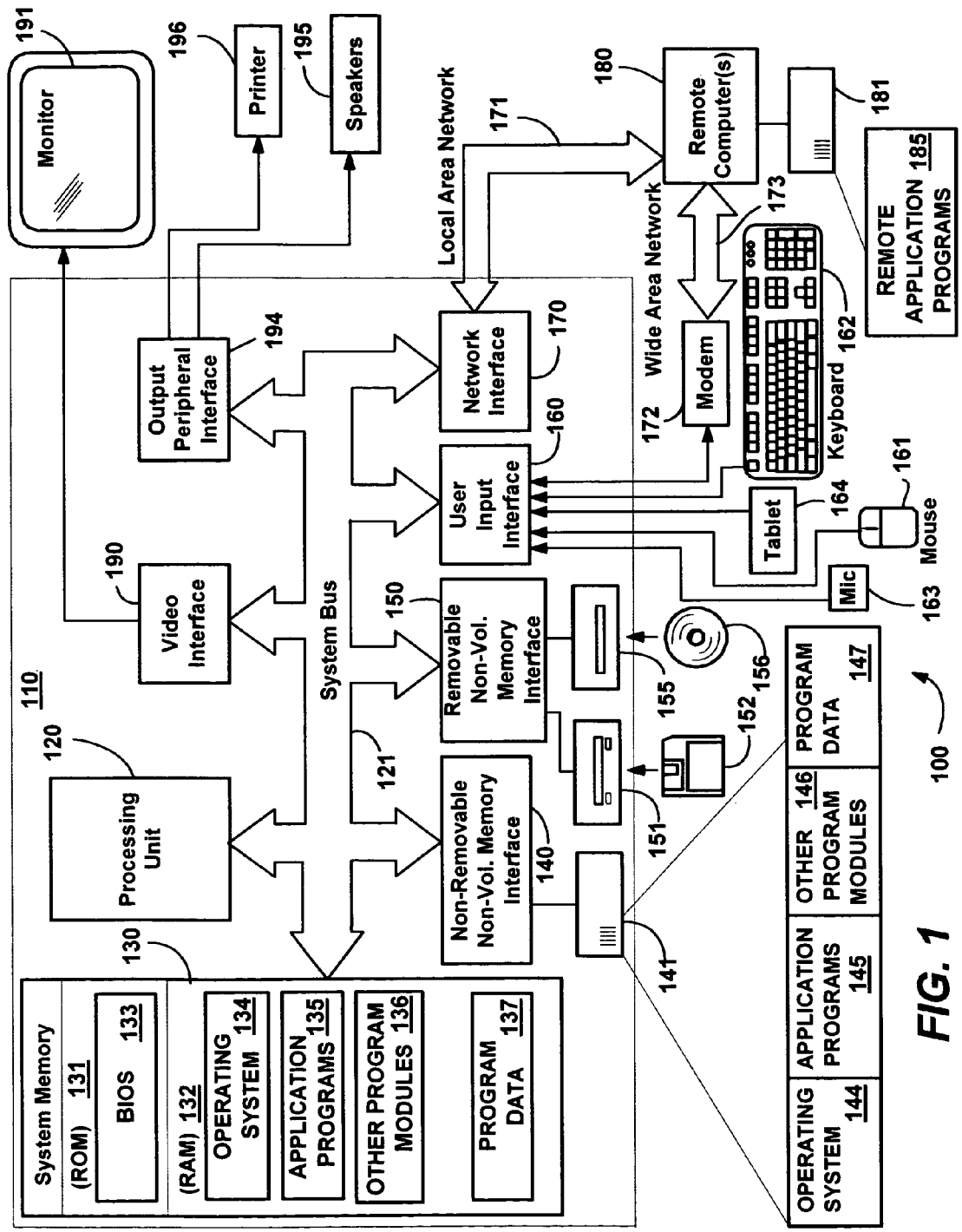
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Web Service Application Protocol and Soap Processing Model

In a distributed programming model, a basic programming primitive is a lightweight port, comprising an unordered collection of messages that can be used to store state and effect communication. Items are stored by reference, and ports support (at least) two primitive operations: Post( ) and Get( ). Posting an item, such as a class instance, buffers the reference and returns immediately. Retrieving an item based on a supplied key can block if no item with the key has been posted by the remote service. Although ports can be used directly by services, they are typically used within the context of a port collection that associates a specific message type with each port in the collection. Port collections can be created with a fixed or a dynamic set of supported message types depending on the flexibility needed, but from a programmer's point of view, a port collection is simply a typed port.

In keeping with the present invention, using strictly port communication, service code can implement critical sections and complicated I/O protocols and produce a very concurrent processing model. To this end, the present invention is, in part, directed towards a protocol (web services application protocol, or WSAP) for communicating with a web service, in which a client consumer requests a server provider to perform some service for the client, and provide the client with an appropriate response. As will be understood, however, the general web service model is not limited to a server running software for a client, but applies to any resource that a client wants to access, e.g., the uniform service model supported by WSAP can be used to model files, devices, services, and people. For example, hardware may be componentized to an extent, and in many ways will be virtually indistinguishable from software-oriented web services, in that a user may select a set of hardware components and interconnect them to perform a computing task. As long as each device obeys the communication protocols, (and the appropriate amount of bandwidth is available), virtually any authorized device will be able to communicate with another device to use its resources.

Figure 2:
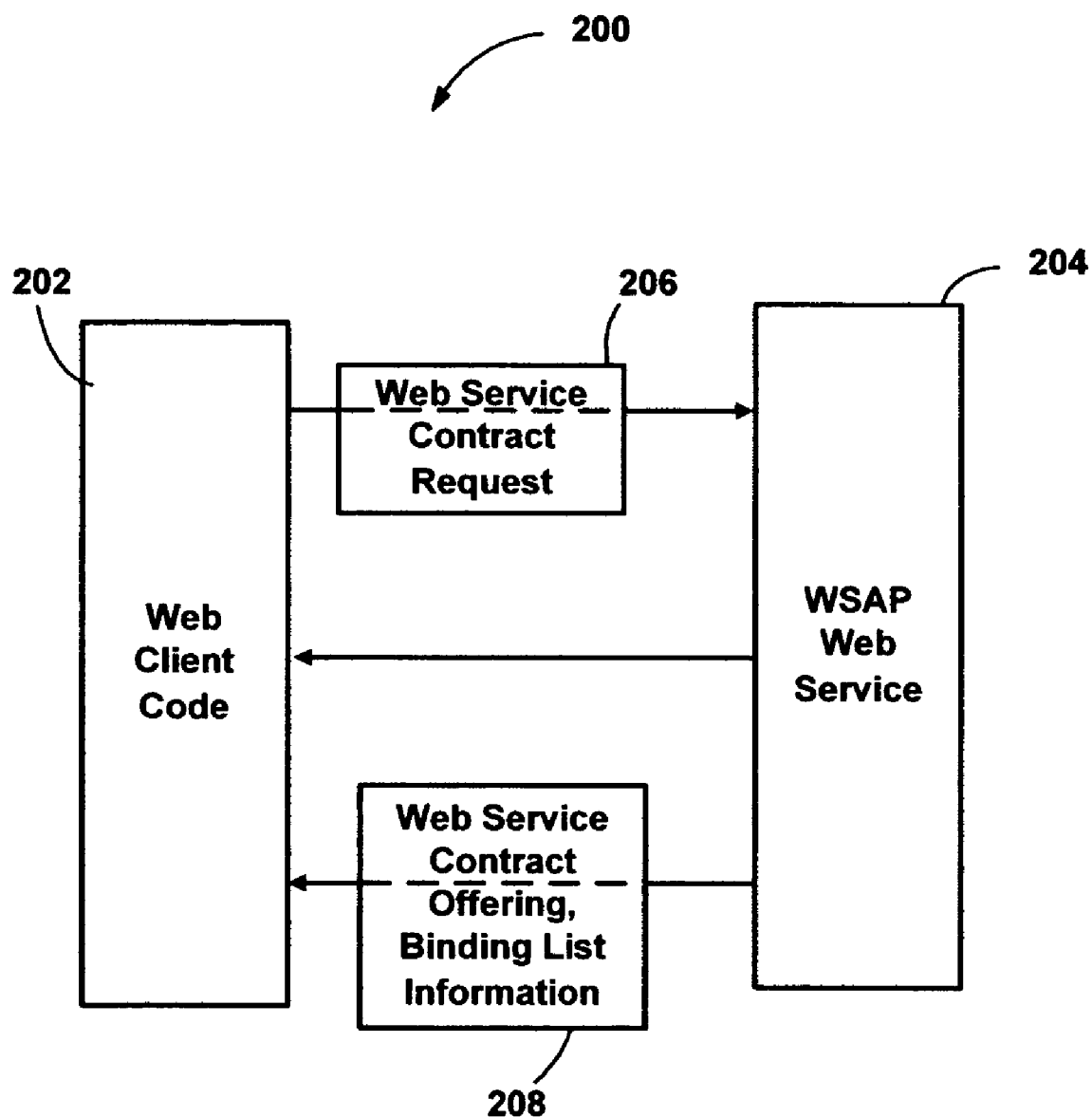
FIG. 2 is a block diagram generally representing services communicating with one another over a web services application protocol, in accordance with an aspect of the present invention.

FIG. 2 represents an architecture 200 comprising web client code 202 (e.g., which may be the computer system 110 of FIG. 1) communicating with a web service 204 via WSAP messages communicated within a SOAP (simple object access protocol) envelope. The identity of a service is described by a named port, (e.g., a URI), and the state of a service is typically described by an XML schema. Note that the service may be local (within the same machine as the client code) or may be a remote resource such as a server or a hardware device. In general, and as described below, WSAP defines, semantically, what a web service does, while the SOAP processing model defines how to compose multiple web services to run in parallel or sequentially, and may be used in accordance with the present invention to compose internal services to a computing device in a manner that is substantially identical to external web services, e.g., via inmemory non-XML serialized data.

As with other web services, WSAP-capable services operate by offering a contract in response to a contract request, as represented in FIG. 2 by the web service contract request 206 and contract offering 208. Note that in WSAP, to obtain a contract, a port is exposed to the client corresponding to a LOOKUP operation, as described below. As also described below, binding list information is provided with the response 208, e.g., as an identifier/port that corresponds to an array of key/value pairs that "instance" the contract, as described below. Services are not required to implement WSAP operations other than the LOOKUP operation, although when the semantics of an interaction is compatible with a WSAP operation, the WSAP service should implement the WSAP operation. In providing a service, the service author may map any interaction or service functionality using WSAP verbs and representations. Not all WSAP verbs have to be used for a particular service, but instead a subset may be used, depending on the scenario.

In accordance with an aspect of the present invention, WSAP is a SOAP-based protocol useful in a distributed computing environment that defines a web service in terms of identity, state, and a set of operations that can be used according to the behavior of the service. This effectively enables services and their state to be operated upon in a consistent and observable manner. In WSAP, a behavioral web service is an abstract notion of a process that has an identity and a behavior. This concept is abstract in the sense that it can apply to many different application models and namespaces. WSAP defines one such application model which has been designed to scale to the Internet at large, but many other application models are possible.

The notion of identity in WSAP is similar to that of a resource identified by a URI in the traditional web model, namely anything that has identity. The purpose of identity is to enable a service to differentiate itself from other services that may exist within the same namespace. As described herein, the scope of WSAP web services may be the Internet, which means that DNS or IP is the naming authority for the URI "authority" component, although in more a limited scope such as within a device or limited network, another naming authority is feasible.

Figure 3:
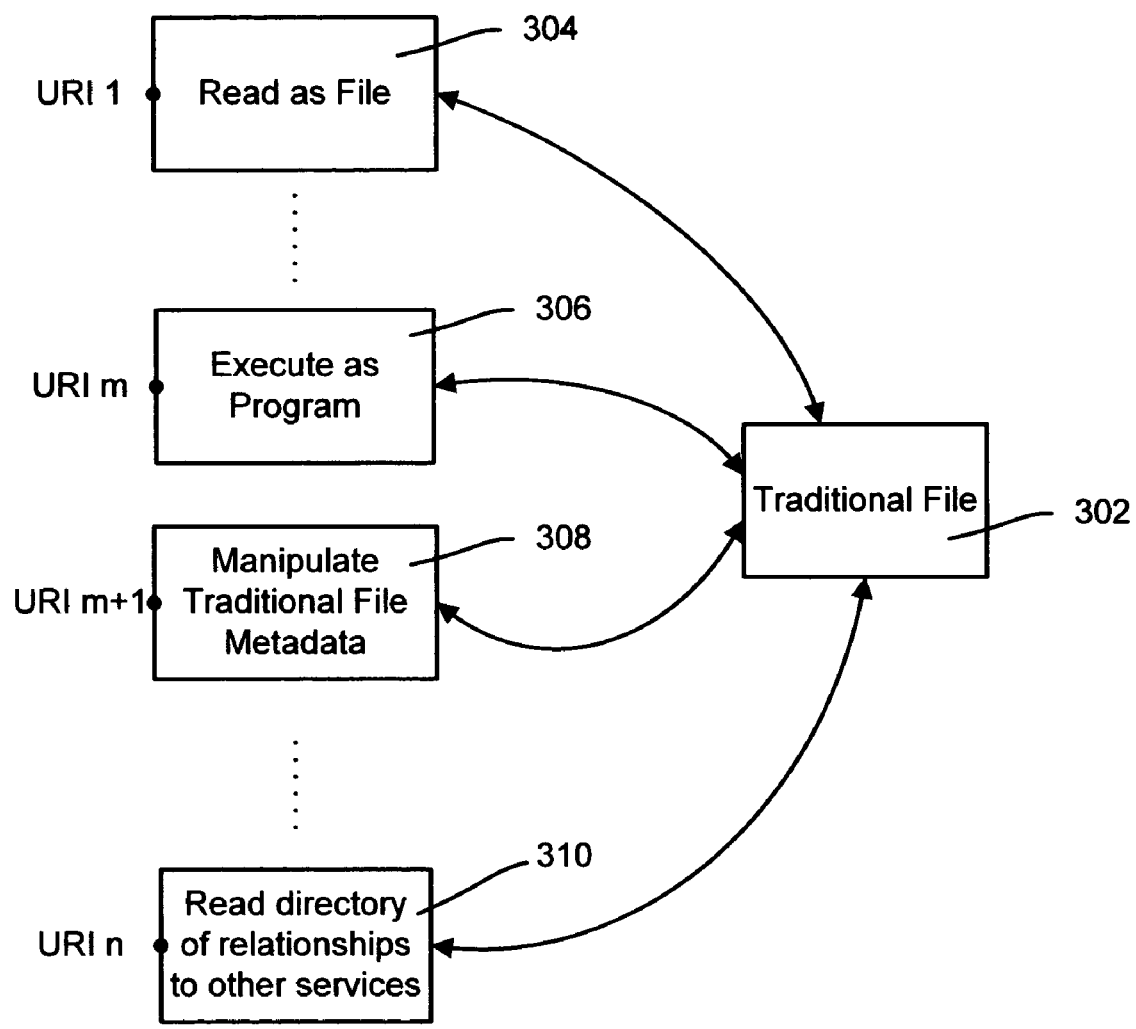
FIG. 3 is a block diagram generally representing the concept of a one-way message exchange pattern when communicating a WSAP message, in accordance with an aspect of the present invention.

Each WSAP web service has a unique identity, such as a URI as exemplified in FIG. 3. As with any other URI (such as on the web), no semantic knowledge is obtained based on the URI alone, and similarly, a relationship (e.g., a containment relationship) between two WSAP web services cannot be deduced from their URIs. In WSAP, URIs may be either relative or absolute. If a URI is relative then its base is determined by XML Base. WSAP does not place any limit on the length of a URI, and thus any WSAP receiver needs to be able to handle the length of any URI that it publishes; WSAP implementations should be able to deal with URIs of at least two kilobytes in length.

The interaction between services (which can be thought of as a protocol) is the behavior of a service, and can be formally described as a behavioral type, with the contract being the description of a service using behavioral types. A service can be implemented in any number of ways, as long as it conforms to the contract it claims to implement. Note that in WSAP, a contract is a service like essentially everything else, whereby contracts are identified by ports (e.g., URIs) and can be operated on as any other service, according to its contract.

The notion of behavior is based on how a service interacts with its environment in terms of the sequence of message types that it generates and accepts. Behavior enables a service to differentiate its particular behavior from the behavior of other services that may exist within the same namespace, and behavior is relative to the set of possible behaviors defined for a particular namespace in which the service is defined. In other words, behavior is a distributed state machine exposed by the service. Thus, by including the interactions of those resources or services with other services, behavior augments the current web model for identifying resources. Two services need to have compatible behaviors to communicate; that is, they must compose. If the behavior of a service is not known by another service, this implies that the two services cannot interact, which is similar to the Web model of a resource wherein a URI cannot be dereferenced because the mechanism for doing so is unknown to the holder of that URI.

From a WSAP service viewpoint, any data, whether it is metadata or data, is represented as a service. That is, rather than exposing the same collection of data (such as a file) as a single entity that can be read or executed, the file is exposed as different services with different contracts. This is represented in FIG. 3, which illustrates the notion of uniqueness in identity and behavior through a traditional file's data 302 exposed as a set of services with different behaviors, with each service having its own URI. As also represented in FIG. 3, among the services corresponding to the behaviors of a file include a read service 304, an execute service 306, a metadata manipulation service 308 and a service for reading a directory of this file's relationships to other services 310. Essentially any other behavior with respect to a file (e.g., write) are also capable of being services, and are implicitly represented in FIG. 3.

Exposing a file as a set of services, each with its own URI, provides significant benefits over a traditional model in which a file is accessed via the file system by its returned handle after opening. For example, with the present invention, once the URI to the media service is known, operations to the file may be performed via an appropriate service, eliminating the need to keep going through a file system to do something with the file data. This is particularly beneficial in distributed computing environments, where, for example, a file system may be on some distant server and/or may be a bottleneck that can be avoided via the present invention.

A primary purpose of WSAP is to provide an application-level protocol framework that resolves what a WSAP web service is and how it is identified, what the behavior of a WSAP web service is and how it communicates with other WSAP web services, and how a WSAP web service relates to other WSAP services and to other resources in general. The framework provided by WSAP, via a set of message operations and exchange patterns, intentionally constrains the notion of a behavioral web service in terms of identity and behavior, but it does not constrain it in terms of structure or complexity. WSAP web services can be used in many diverse application contexts. For example, in addition to the concept of a file as a service as shown in the example of FIG. 3, other straightforward examples of uniqueness in identity and behavior are feasible, such as by assigning ports to the divergent behaviors of a device, or to those of a simple chat service. Note that for simplicity, the examples herein use relatively low-level entities and services, however it should be understood this model applies equally well to more complex entities such as business entities and their relations.

In addition to service identity and service behavior, a behavioral web service has the notion of a service state, sometimes referred to as a "service value." More particularly, WSAP message operations may involve the exchange of serialized state that represents parts or subparts of a service, (but not the WSAP service itself). The serialized state of a service is called the service value, as opposed to the behavior which represents the service type. A service can have any value that is allowed by the behavior of the service, and that value may change over time. Note that WSAP operates on services, and employs a service representation, which represents the serialized state of a service. A service may have zero or more possible representations, that is, it is possible for a service not to have any representations. WSAP operations may involve the exchange of service representations, but not the exchange of services themselves. A service representation may change over time and may vary as a function of the conditions that led the representation to be generated. Applications interact through the exchange of representations, not through the exchange of services.

Figure 4:
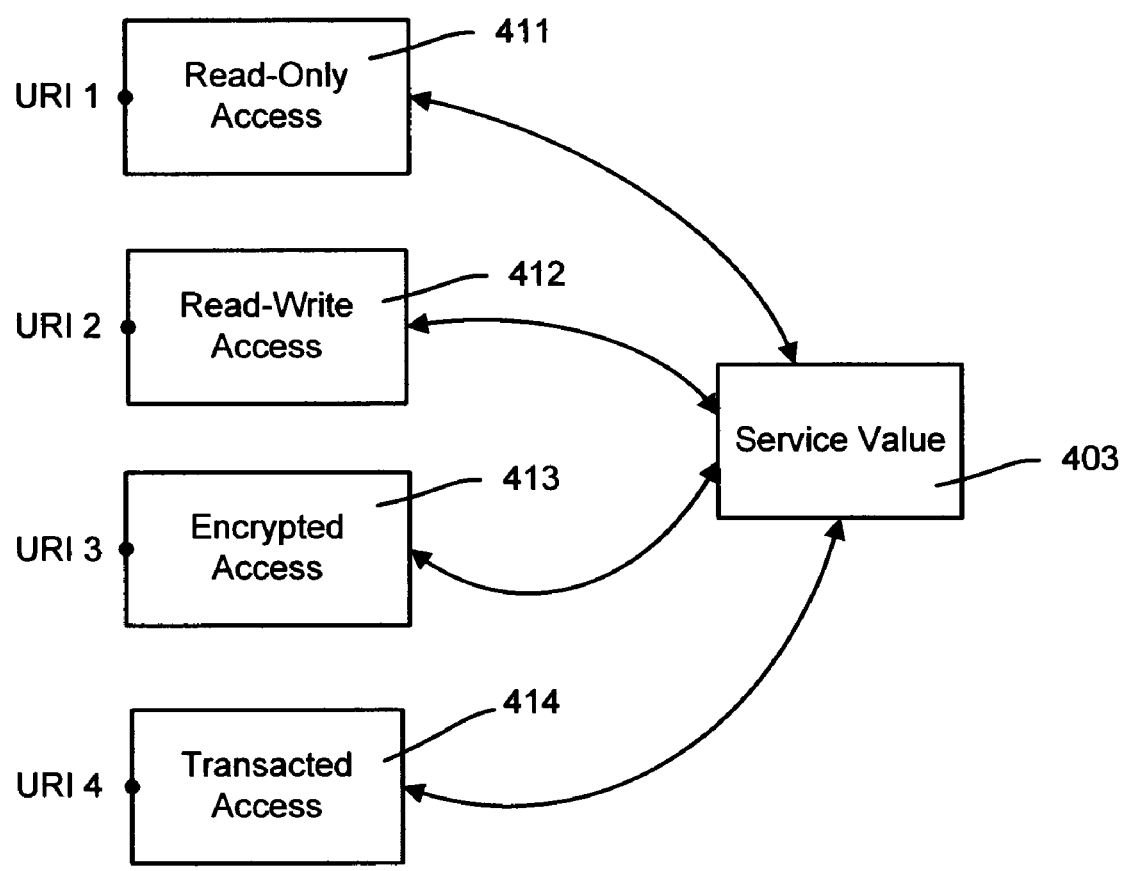
FIG. 4 is a block diagram generally representing an example request-response message exchange pattern for WSAP messages, in accordance with an aspect of the present invention.

FIG. 4 shows a service value 403, in which the service value can be any data (e.g., state data of the file), such as database data, alphanumeric data, an image of a house, or an image of a flower. From a service point of view, the same service value can be represented as different services with different ways of interacting. As described above, because different behaviors are modeled as separate services, properties that affect behavior, such as access rights and properties of the communication, can result in different services.

In FIG. 4, different access models to the same service value are modeled as different services 411-414, including read-only access, read-write access, encrypted access and transacted access, respectively. Note that synchronization between dependent services can be done using the WSAP replication model, described below.

Considering FIGS. 3 and 4, it is seen that a file system is one example of an entity that contains multiple "views" of data, that is, files, including metadata (such as filename, length, owner, and access permissions) and data (such as the file contents). In addition, the view of a file depends on the access permissions of the entity that opens the file, and indeed, the behavior of a read-only file differs from the behavior of a read-write file. As such, a file system is easily modeled as a set of behavioral services.

Once services are connected via compatible contracts, services can interact with each other by generating and accepting sequences of messages of specific types. To this end, WSAP defines a set of message operations with associated semantics. Each message operation comprises a set of messages of specific types that are exchanged between the two communicating parties.

In accordance with another aspect of the present invention, WSAP builds on the definition of a behavioral web service in which the framework for determining identity and behavior is defined in terms of a shared set of message operations and message exchange patterns. WSAP message operations are defined by the client code 202 (FIG. 2), typically an application program, wherein an operation involves exchanging messages of specific types using one of the message exchange patterns defined by WSAP, as described below with respect to FIGS. 5 and 6. As also described below, ports provide synchronization through communication, and SOAP provides a processing model for messages exchanged between services.

A goal of WSAP is to provide a common application-layer foundation for defining web services and their interactions. Note that SOAP is designed to support multiple application models, and applications are free to use the full spectrum of the SOAP extensibility model. However, one intent of WSAP is to define an application model that is generally useful for a large variety of decentralized applications. Another goal of WSAP is to enable a high degree of interoperability, leading to a potential increase in usefulness of the overall system.

To accomplish these goals and others, WSAP defines a web service application model based on a set of common message operations. Note that the notion of a common vocabulary applied to web services has heretofore not been known. WSAP defines an overall structure and semantics of operations with familiar-sounding names such as LOOKUP, QUERY, INSERT, UPDATE, DELETE, GET, and DROP, whereby individual services can inherit from these operations while preserving support for late binding. In general, capital letters are ordinarily used herein for WSAP operations, to differentiate the WSAP operations from traditional verbs, but there is no requirement that the operations use capital letters, and further, that other or differently-named sets of WSAP operations are feasible, and services can define their own additional operations as desired.

The operations enable applications to communicate with other services. For example, LOOKUP provides information about a service in the form of a contract, which GET and QUERY can be used to retrieve current state of the service. CREATE and DROP operations can create and delete services, and so on, as described below. Most of the operations are polymorphic over the particular shape of a message, so that individual services can tailor the structure of a messages to the shape of the service. For example, the soap Body element of an INSERT request message defined by a directory service is different from an INSERT request message defined by a loader service, but they both follow the same basic semantics.

WSAP message operations can be thought of as mini-contracts that can be composed into more complex contracts. This allows applications to combine message operations into sequences that suit their particular needs and thereby build more complex services. In other words the WSAP operations themselves can be composed and/or ordered to define more complex behaviors for a service. For example, a service may be defined as accepting a QUERY operation followed by an UPDATE operation; (QUERY and UPDATE operations are described below). Note that a URI can thus represent a sequence of WSAP operations, meaning that the URI itself can represent a single behavior or a complex behavior. Although not required by WSAP, contracts can be used to great advantage to achieve desired composability.

In addition to the potential increased value in the periphery of the network, using shared semantics where possible enables a higher degree of transparency of the overall system. As a result, performance optimizations such as caching and other intermediate processing services can be deployed throughout the system to achieve the scalability required for an Internet-wide system.

More particularly, WSAP operations have properties that allow intermediaries such as a cache service, a load balancer service, a data compression service, a replication service, an encryption/decryption service, and so on to process messages. Two such properties that qualify a WSAP operation include whether an operation is "safe" and/or "idempotent." An operation is idempotent when the result of a successful execution is independent of the number of times the operation is executed. An operation is safe if its semantics are limited to read-only access to the resource to which it is applied. Note that a safe operation is idempotent by definition, however the reverse is not true, and thus read-only operations are both safe and idempotent. Further, note that these qualifiers apply to an operation, not a particular implementation of that operation.

These qualifiers provide a service-level expectation between the party that initiates the operation and the targeted service. Note that a particular implementation of a safe or idempotent operation might have second-order side effects associated with executing the operation. Typical examples of such side effects are logging, processing associated with generating the read-only data in the case of dynamic contents, state-management updates, and so forth. Such second-order side effects do not affect the notion of safe and idempotent operations.

As a result, an intermediary service can process exchanged messages to add value to communications. By way of example, consider an intermediary such as a cache. In this example, the client connects to a service that provides access to data, and in response the client receives a URI to the cache. In order to return data in response to a GET and/or QUERY request, the cache need know nothing about the contents of the data, e.g., how it is internally formatted, whether it is encrypted, and so forth, but does know from the requested operation type that processing the message will not change the state of the underlying resource behind the cache. As a result, the cache service can safely read data from its own cache storage to satisfy any GET and/or QUERY requests. If a request that will change state is received, e.g., a WSAP INSERT, DELETE or UPDATE operation, the cache service can pass the message to the appropriate URI, or alternatively, the client can use the different URI to change state, in which event the cache service will be notified that some part of it is invalid.

In accordance with another aspect of the present invention, WSAP operations are based on two message exchange patterns, namely one-way and request-response, with support for intermediate responses before the arrival of the final response. While WSAP messages could potentially be carried over a multicast-enabled infrastructure, the semantics of the WSAP message operations are that of a point-to-point communication. Note that WSAP describes the behavior of a web service in a formalized manner, which is a major difference between WSAP and other protocols.

Figure 5:
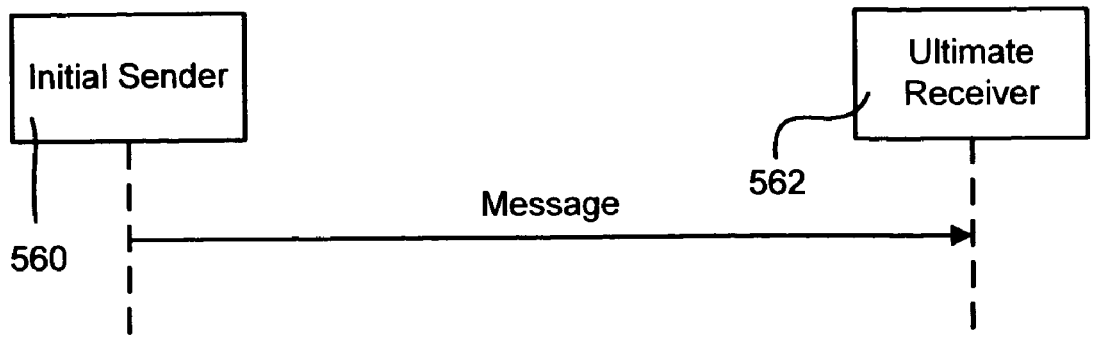
FIG. 5 is a block diagram generally representing a file exposed as set of services with different behaviors, in accordance with an aspect of the present invention.
Figure 6:
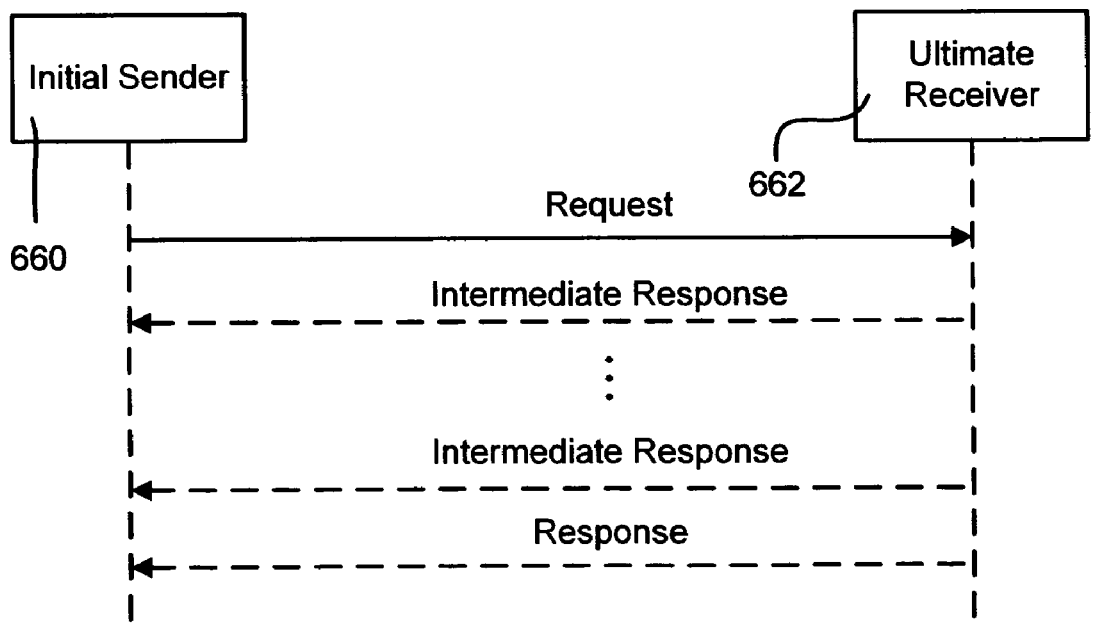
FIG. 6 is a block diagram generally representing different access models modeled as different services regardless of whether involving the same service value, in accordance with an aspect of the present invention.

FIGS. 5 and 6 represent the WSAP operations using one-way and request-response message exchange patterns, respectively. In either situation, both the sender and receiver are named WSAP services (e.g., via a URL). Note that this differs from client/server protocols such as HTTP, in which only the target resource of the request is named.

The one-way message exchange pattern is represented in FIG. 5, and comprises a message sent from an initial sender to an ultimate receiver through zero or more intermediaries. Note that if a one-way message results in the generation of a SOAP fault (described below), no SOAP Fault message is returned to the initial sender.

The request-response message exchange pattern is represented in FIG. 6, and comprises a request message sent from an initial sender to an ultimate receiver through zero or more intermediaries, followed by zero or more interim responses sent from the ultimate receiver to the initial sender of the request, also through zero or more intermediaries. Note that there are no time constraints imposed on this message exchange pattern, and operations that support this message exchange pattern can be used in both synchronous and asynchronous communication models. Further, note that if a request message results in the generation of a SOAP fault as described below, a SOAP Fault message is returned to the initial sender, however if a response message results in the generation of a SOAP fault, a SOAP fault is generated, but the SOAP fault is not sent to the responder.

In accordance with an aspect of the present invention, a WSAP operation includes a set of message types carried as SOAP Body contents, the behavior of these message types, and the semantics implied by invoking the operation. For SOAP messages, a WSAP message type can be composed with an open-ended number of SOAP features, typically expressed as SOAP header blocks. Examples of such features include but are not limited to security, routing, and reliability.

The following C# class (used in some cases like an IRP data structure) represents a SOAP envelope in one implementation:

```
msgSoapEnvelope
{
    IPortCollection portHeader;
    IPort portBody;
}
```

Handling a SOAP envelope involves message generation, message exchange, and message parsing. The portHeader port is used by intermediaries in a SOAP processing group to exchange serialize-able or strictly internal header constructs. The second port, portBody, stores the body of the message. The use of ports inside this container allows concurrent and thread-safe manipulation of the SOAP envelope. A strict pipeline model or stack-based model (which often has problems handling interactions between SOAP header blocks and/or the SOAP body) is not required.

An advantage of the WSAP-based implementation of the SOAP processing model is that it matches the inherent support in SOAP for concurrent processing of a SOAP message. Via the ports, which correspond to behaviors, the implementation facilitates the concurrent processing of messages by several services. For example, a SOAP-aware serializer may serialize or deserialize the header and body of a given SOAP message concurrently with other service operations. This allows services that depend upon parts of the SOAP envelope to unblock whenever a header that the service cares about is available. The SOAP deserialization itself is not atomic due to this concurrent parsing design. For better performance, the forwarding and transport services never serialize the SOAP envelope if two communicating parties are co-located.

Since SOAP is used, failure in executing any of the WSAP operations using the request-response MEP is reported using a SOAP fault structure, and SOAP faults generated by WSAP applications need to include a SOAP Action element information item whose value reflects the SOAP fault with a value of the S:Envelope/S:Body/S:Fault/S:Code/S:Value. In general, there are individual actions per fault.

In accordance with an aspect of the present invention, WSAP message types can be identified. Intermediaries and other SOAP nodes that do not care about the specific type of a SOAP Body, or that cannot see the contents of the SOAP Body (e.g., if it has been encrypted) can use the SOAP Action element information item, for example, as carried by WS-Addressing. The WSAP operations define unique Action values.

SOAP nodes that do care about the specific type of the SOAP Body can use the type of the XML Expanded Name of the outermost element information item of the SOAP Body. WSAP defines a set of abstract element information items that need to be substituted for message types defined by the application.

For SOAP faults, the model is similar but the use of SOAP fault codes provides an added level of inspectability in that intermediaries and other SOAP nodes that do not care about the details of the SOAP fault can inspect the SOAP fault codes.

In addition to the operations described above, the exposure of state enables less traditional operations such as caching and replication as well as a uniform publication/subscription (pub/sub) model that can be applied consistently to all services. This has been used to build generic applications that can test, monitor, and manage services within a distributed operating system nodes and across nodes.

Sessions are also modeled as services in WSAP, wherein session management refers to differentiating between value states according to the caller. As one example of session management, HTTP cookies are often used to personalize Web pages according to the user across independent HTTP operations. A problem with cookies, however, is that the state and possibly behavior of a service depends on the value of a cookie, which is inconsistent with the behavioral web service model. However, because WSAP models a session as another service, rather than using session identifiers or cookies to identify a session, the session is a service with state and behavior, just like any other service that is created, operated on, and terminated.

In addition to service interactions as described above, services can relate to one another in ways that do not involve the actual exchange of WSAP messages. Examples of such relationships include (but are not limited to) a security policy that describes a set of services as belonging to the same security group, and a management statement that describes how a set of services are administered by a particular party. In such example cases, the descriptions refer to a set of services, but the description does not involve any actual communication between the involved services. However, it is still important to capture the relationships, even though no explicit WSAP messages are being exchanged.

It is possible to model these relationships as behavioral types and describe them as part of contracts. These contracts are called "graph contracts," to differentiate these relationship contracts from WSAP message contracts. Graph contracts are described using the same description language as other contracts.

Turning to an explanation of the shared semantics, in general, services are created by other services. More particularly, services can be created using the CREATE operation, which creates a new service by copying an existing service. To this end, a newly created service has the service behavior and service value of a creating service, that is, the service that accepts the CREATE operation acts as a template for the value of the newly created service. The CREATE request may contain additional state that is used to initialize the newly created service. This enables services to be initialized with otherwise immutable state. The CREATE request may contain state that modifies the copied state of the newly created service according to the shape of the service. It is feasible to name the proposed endpoint as part of the CREATE request or have the creating service provide the name. Note that legacy services may be exposed as web services without directly being created as a web service.

In WSAP, a service that supports the CREATE operation can create services of a specific behavior. Any service may support the CREATE operation and thus may support the creation of as many behaviors as desired. Because WSAP operations are associated with explicit services, the CREATE operation is a request for the targeted service to create a new service. The CREATE operation does not create the targeted service itself.

Figure 7:
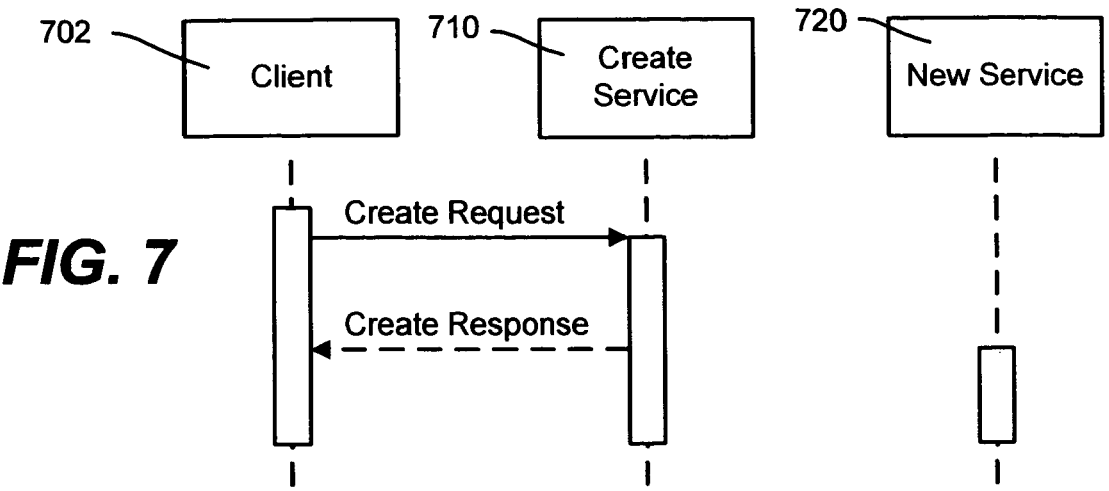
FIG. 7 is a diagram generally representing an example sequence of messages in a CREATE operation followed by explicit initialization, in accordance with an aspect of the present invention.

FIG. 7 represents how the CREATE operation can cause one or more dependent services to be created. In simple service creation, the CREATE operation creates a single service via a create sequence followed by explicit initialization. In FIG. 7, the client 702 initiates a CREATE operation with a service 710 that handles such operations. As with web services in general, the CREATE request contains a contract for the type of service to be created. Creating a service includes allocating a URI for the service and associating the service with a given behavior. After a service has been created, additional message operations may involve changing the service value according to the structure of the service, and/or associating the new service with other services through relationships, access control, or other mechanisms.

The response contains an instanced contract that contains the URI of the newly created service 720. After the service has been created, it can be operated on according to its behavior and relationships to other services as appropriate. For example, the service can be associated with a security policy by manipulating the services that handle such policies.

The following table sets forth the properties for a WSAP CREATE operation:

| Property Sheet for CREATE | |
|---|---|
| Property | Value |
| MEP | Request-Response |
| Request Action | http://abc/def/ghij/10/wsap/createrequest |
| Response Action | http://abc/def/ghij/10/wsap/createresponse |
| Safe | No |
| Idempotent | No |

The following data structure contains the SOAP Body contents of a sample CREATE operation. The request is defined by the service; the response uses a convenience type defined for empty responses:

```
<M:MyServiceCreateRequest
  xmlns:M="http://www.example.org/myservice">
    <M:MyServiceInfo>
        <M:Status>ok</M:Status>
        <M:MaxEntries>100</M:MaxEntries>
    </M:MyServiceInfo>
</M:MyServiceCreateRequest>
<W:DefaultCreateResponse
  xmlns:W="http://abc/def/ghij/10/wsap.xsd"/>
```

Figure 8:
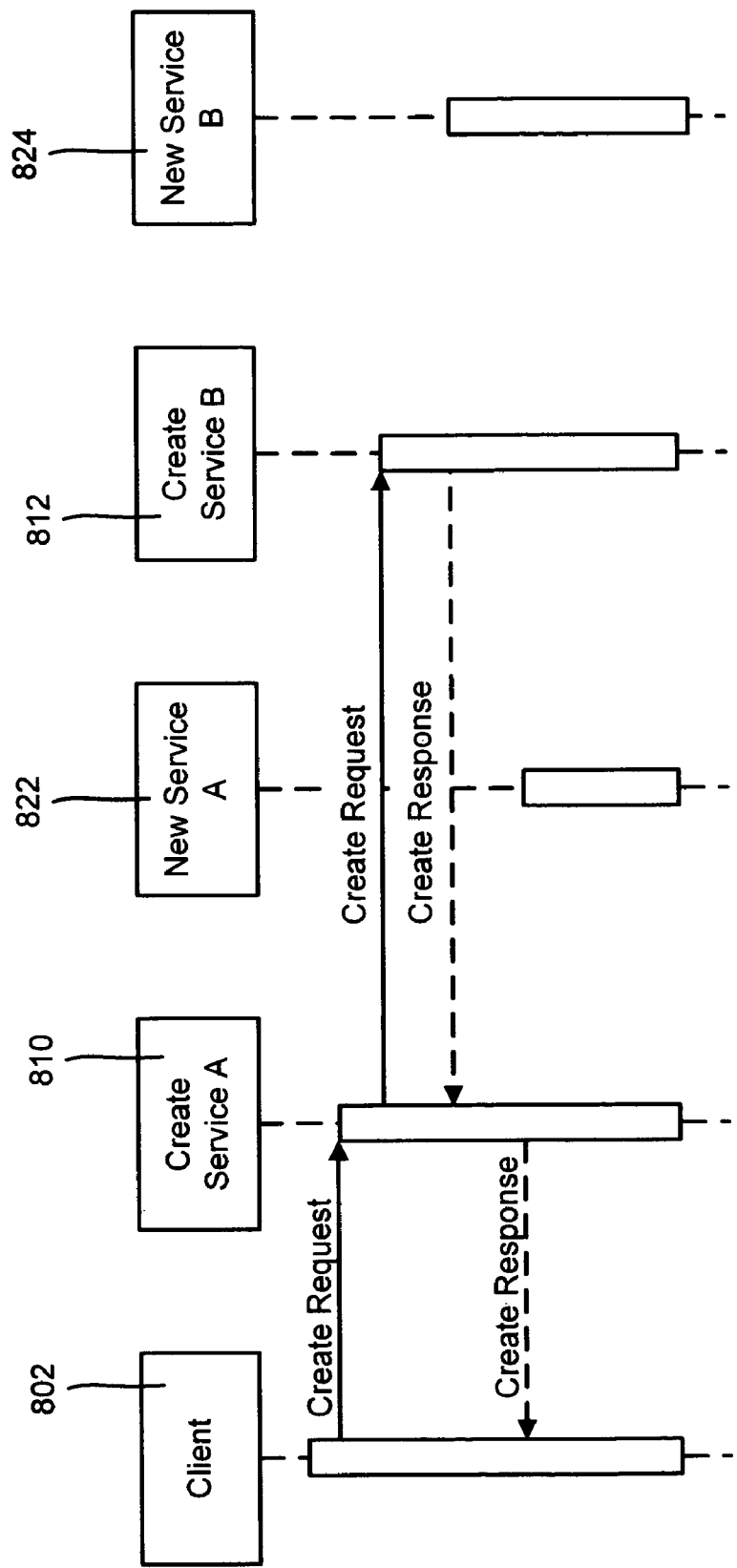
FIG. 8 is a diagram generally representing an example sequence of messages for complex service creation, in accordance with an aspect of the present invention.

In a more complex service creation, the CREATE operation creates a set of related services. For example, complex service creation may occur if the create service knows that a set of services are related in such a way that they always exist together. FIG. 8 is a sequence diagram that exemplifies the creation of two services. In FIG. 8, as in the simple service creation case, the client 802 initiates a CREATE operation with a service 810 (Create Service A) that handles such operations. The operation request contains a contract for the type of service to be created. The Create Service A service 810 initiates another CREATE operation against Create Service B (labeled 812 in FIG. 8) to create another new service 824, Service B.

After services A and B (822 and 824) have been created, the Create Service B service 812 sends a create response to the Create Service A service 810, which in turn sends a create response to the client 802. The create response sent by the Create Service A service 810 contains an instanced contract that contains the URIs of the two newly created services 822 and 824. Note that in complex service creation, WSAP provides no inherent guarantees that the services are created within a transaction context. Such guarantees can be provided by augmenting the behavior of the services with transaction support.

As described above, the behavior of a WSAP service is described as a contract. A contract is typically serialized as an XML document, although this is not required. The contract itself is a service, and as such, the contract is identified by a URI and can be operated on according to its contract, just as any other service.

A service may have the URI of another service but not its contract, which is required for the two services to communicate. To obtain the contract, the WSAP protocol requires that every service support the LOOKUP operation, which enables a service to ask another service for its contract and thereby to determine the behavior of a service:

| Property Sheet for LOOKUP | |
|---|---|
| Property | Value |
| MEP | Request-Response |
| Request Action | http://abc/def/ghij/10/wsap/lookuprequest |
| Response Action | http://abc/def/ghij/10/wsap/lookupresponse |
| Safe | Yes |
| Idempotent | Yes |

The following shows the SOAP Body contents of a sample LOOKUP operation. Both the request and the response are defined by WSAP:

```
<W:LookupRequest xmlns:W="http://abc/def/ghij/10/wsap.xsd"/>
<W:LookupResponse xmlns:M="http://abc/def/ghij/10/wsap.xsd">
    <W:Contract>http://www.example.org/myservice</W:Contract>
    <W:BindingList>http://www.example.org/mybl</W: BindingList >
</W:LookupResponse>
```

Figure 9:
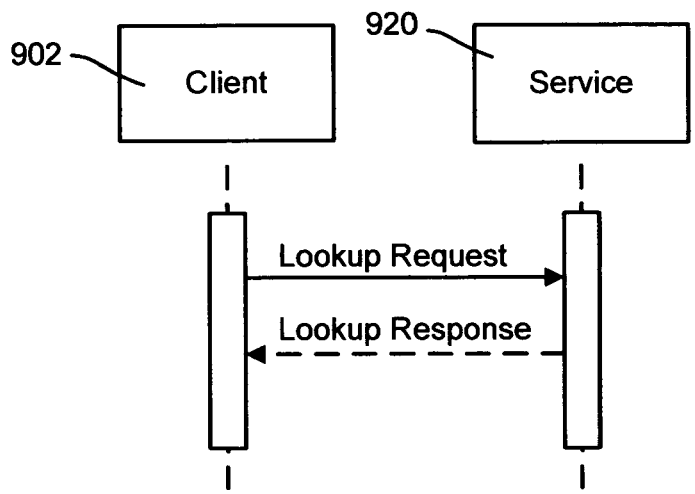
FIG. 9 is diagram generally representing an example sequence of messages in a LOOKUP operation, in accordance with an aspect of the present invention.

FIG. 9 shows a sample sequence illustrating the LOOKUP operation between a client 902 and a service 920. The lookup response contains a URI of the contract, which as mentioned above is also a service, although it would be feasible to return the contract itself.

Thus, in one implementation, LOOKUP returns a URI to a document that contains the serialization of the contract/protocol. A contract not only defines the order of the messages, but also defines the interaction points, represented by ports with URIS, on which the messages are exchanged. Further, that document, plus a BindingList, which is an array of key/value pairs, are used to "instance" the contract document. This allows generic names to be replaced by the true values at runtime, and allows relationships between instances of services to be determined at runtime, providing a reflective capability between instances of services. Contracts/binding lists thus enable the management of dependencies in a distributed setting, and at the same time, specify required services at startup.

For service state retrieval, the WSAP protocol defines two operations, named GET and QUERY. While both operations are safe and idempotent, a difference between a GET and a QUERY operation is that as described below, the QUERY request contains a structured query, whereas a GET request is an application-independent request for a snapshot of the current state of the service. As a result, a QUERY request requires specific schema knowledge about the service being queried, whereas a GET request does not. A consequence of this difference is that a QUERY request contains parameters that are not part of the name of the service (the structured query) whereas a GET request provides the parameters that identify the service as part of the name of the service.

By supporting both QUERY and GET, WSAP supports structured identifiers as well as opaque identifiers, and enables mapping between such solutions. This is because depending on the context of their use, there are advantages to either one. More particularly, in naming services, there is a tension between using structured names such as queries and semantically opaque names such as URIs. For example, consider an example service identified as "http://example.com/people" that can provide a structured representation of names of people. A particular person can be referred to in at least three different ways, namely as a structured query, as an unstructured query encoded in the URI query component, or as an opaque identifier that is part of the URI path component. A structured query issued against the service requires knowledge about the structure of the service in order to refer to any particular person, as shown in the following example of a structured query issued against the example service "http://example.com/people"

```
<Query>
  <Name>
    <First>Santa</First>
    <Last>Claus</Last>
  </Name>
</Query>
```

In contrast, an unstructured query encoded as a non-opaque part of the URI query component would typically use URI HTML form encoding. This model requires knowledge about the set of name-value pairs, but it does not require structured knowledge about the particular service in order to compose a URI that encodes these name-value pairs. The following example shows such an unstructured query encoded as a name-value pair in the URI query component:

```
http://example.com/people?first=santa&last=claus
```

An opaque identifier that is part of the URI path component does not reveal that the actual resolution may involve a query. The only thing that the client needs to know is how to resolve the identifier, in this case by using HTTP. The following example shows such an opaque identifier, which does not express any part of the query:

```
http://example.com/people/12345678
```

A benefit of the query solution that the query parameters can be strongly typed. However, a consequence is that the structured query becomes part of the identifier for the person. This means that any entity that whoever wants to refer to that person needs to use and also understand that particular structured name. Structured names that identify other things will have different shapes which also require special knowledge in order to use. In some cases this works well, particularly when the user is expected to operate on the data. However, because special knowledge is required, scalability can quickly become a problem, because it is difficult to deploy a notion of a name outside the group that has specific knowledge about that particular shape of names.

Another important difference between the identifiers is the level of data-hiding that exists. More particularly, the query solution requires knowledge of the structure of the query, while the unstructured encoded query and opaque solutions provide gradually less information. The unstructured encoded query can be used if there are certain keywords that can be made public, especially if it helps to decrease the number of URIs that must be mapped. Typical examples of such applications are public search engines such as Google™ ("http://www.google.com/search?hl=en&ie=UTF-8&oe=UTF-8&q=msft") and typical stock quote services ("http://moneycentral.msn.com/scripts/webquote.dll?iPage=qd&Sy mbol=msft").

The unstructured encoded query solution is the most commonly used type of identifier on the Web today, but it is very difficult to encode structured data in a URI. Furthermore, data encoded as part of a URI is inherently public to the infrastructure, which makes it harder to deal with security-related issues for any data that is part of the identifier. The opaque identifier solution does not support a query interface unless a model exists for mapping a query to that identifier. If the structure of a query is known only to a portion of the potential users of the service (e.g., for privacy or other reasons), this can be done by exposing none or a restricted part of the structured data by using the unstructured encoded query solution or the opaque identifier solution.

Thus, the GET operation can be used to retrieve the serialized value state of a service, and has the following properties:

| Property Sheet for GET | |
| --- | --- |
| Property | Value |
| MEP | Request-Response |
| Request Action | http://abc/def/ghij/10/wsap/getrequest |
| Response Action | http://abc/def/ghij/10/wsap/getresponse |
| Safe | Yes |
| Idempotent | Yes |

The following table contains the SOAP Body contents of a sample GET operation. The request is defined by WSAP; the response is defined by the service:

```
<W:GetRequest xmlns:M="http://abc/def/ghij/10/wsap.xsd"/>
<M:MyServiceGetResponse
xmlns:M="http://www.example.org/myservice">
  <M:MyServiceEntries>
    <M:Entry>http://www.example.com/first/endpoint</M:Entry>
    <M:Entry>http://www.example.com/second/endpoint</M:Entry>
    <M:Entry>http://www.example.com/third/endpoint</M:Entry>
    <M:Entry>http://www.example.com/fourth/endpoint</M:Entry>
  </M:MyServiceEntries>
</M:MyServiceGetResponse>
```

Figure 10:
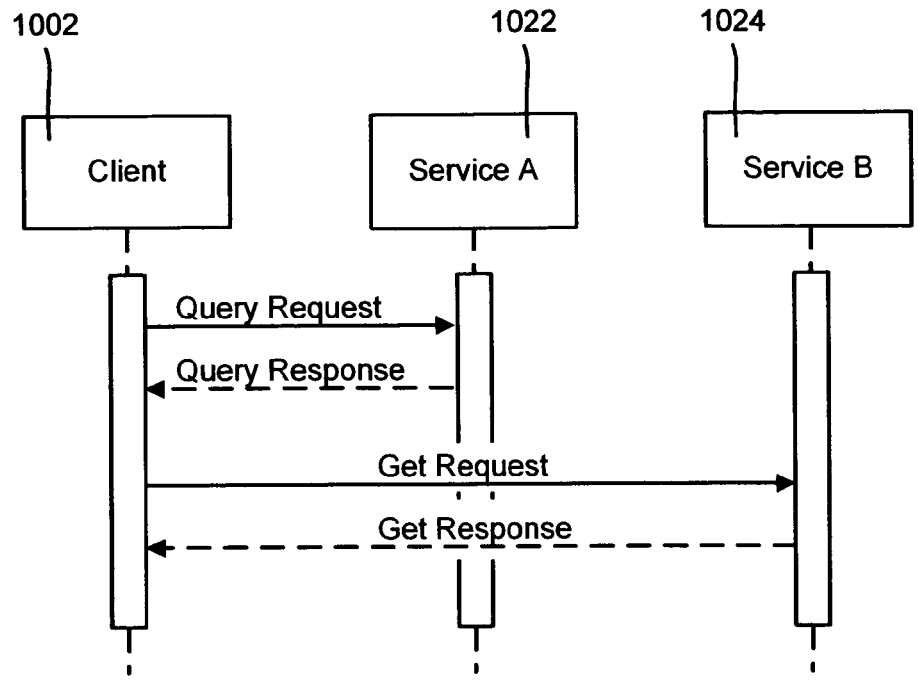
FIG. 10 is a diagram generally representing a sequence for mapping from a QUERY operation to a GET operation, in accordance with an aspect of the present invention.

QUERY requests can in some cases be mapped to a GET operation, as for example, such a mapping effectively provides an identifier for a particular query. For example, this provided benefits when the same query occurs in many different contexts, or when a URI reference is needed in order to introduce caching. FIG. 10 shows a sample sequence illustrating mapping from QUERY to GET. The QUERY response contains the URI for service B which can provide the same result as the QUERY against A. Note that the mapping can be done by any service, and does not have to be related to the service against which the QUERY is targeted.

Thus, the QUERY operation also can be used to query for the serialized value state of a service, and has the following properties:

| Property Sheet for QUERY | |
|---|---|
| Property | Value |
| MEP | Request-Response |
| Request Action | http://abc/def/ghij/10/wsap/queryrequest |
| Response Action | http://abc/def/ghij/10/wsap/queryresponse |
| Safe | Yes |
| Idempotent | Yes |

The following table contains the SOAP Body contents of a sample QUERY operation. Both the request and the response are defined by the service:

```
<M:MyServiceQueryRequest
xmlns:M="http://www.example.org/myservice">
    <M:Entry>http://www.example.com/eight/endpoint</M:Entry>
</M:MyServiceQueryRequest>
<M:MyServiceQueryResponse
xmlns:M="http://www.example.org/myservice">
    <M:MyServiceEntries/>
</M:MyServiceQueryResponse>
```

Note that because the GET and QUERY operations are safe and idempotent, and known to be such via the observable nature of the shared semantics, various intermediaries can provide value to the message exchange. For example, a cache service knows that a QUERY or a GET request does not change state. As a result, the cache can continue to provide state data in response to such requests indefinitely unless and until an operation that changes state is detected.

In addition to state retrieval, WSAP enables the state of services to be updated using INSERT, UPDATE, and DELETE operations. These operations apply only to the value of a service; they do not create or terminate services.

The data structure of a WSAP service is defined by the service as a function of its behavior. As a result, the INSERT, UPDATE, and DELETE operations require the requester to have knowledge about this structure in order to affect the value of the service, similar to QUERY. Thus, the INSERT, UPDATE, and DELETE operations are defined in the abstract so that they can be tailored to individual services.

Figure 11:
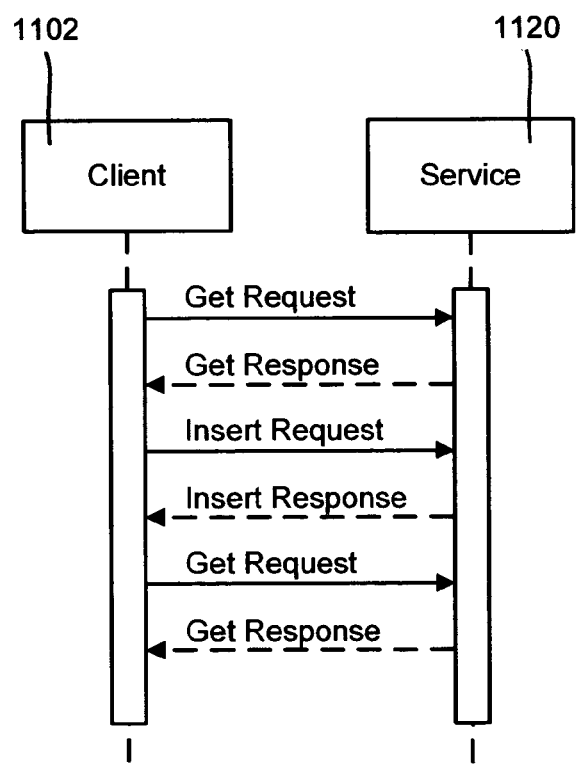
FIG. 11 is a sequence diagram showing a difference between a GET operation performed before and after an INSERT operation to demonstrate the result of the INSERT operation, in accordance with an aspect of the present invention.

When the value of a service is modified using an INSERT operation, the value included in the INSERT request is added to the service value. Assuming a service is being observed in isolation, the result of an INSERT operation can be detected by looking at the difference between a GET operation issued before the INSERT operation and a GET operation issued after the INSERT operation, as generally represented in the message sequence diagram of FIG. 11. In FIG. 11, the client 1102 receives the state data from the service 1120 before the insert operation, and receives updated state data upon the next request following the insert operation.

The INSERT operation can be used to add serialized value state to the service as described via the following properties:

| Property Sheet for INSERT | |
|---|---|
| Property | Value |
| MEP | Request-Response |
| Request Action | http://abc/def/ghij/10/wsap/insertrequest |
| Response Action | http://abc/def/ghij/10/wsap/insertresponse |

-continued

| Property Sheet for INSERT | |
|---|---|
| Property | Value |
| Safe | No |
| Idempotent | No |

The following table contains the SOAP Body contents of a sample INSERT operation. The request is defined by WSAP; the response is defined by the service. The example does not indicate any ordering of where the data is to be inserted, however applications may define their schemas to accommodate ordering constraints:

```
<M:MyServiceInsertRequest
xmlns:M="http://www.example.org/myservice">
    <M:MyServiceEntries>
        <M:Entry>http://www.example.com/fifth/endpoint</M:Entry>
        <M:Entry>http://www.example.com/sixth/endpoint</M:Entry>
    </M:MyServiceEntries>
</M:MyServiceInsertRequest>
<W:DefaultInsertResponse
xmlns:M="http://abc/def/ghij/10/wsap.xsd"/>
```

The structure of the service is defined by that service, and WSAP does not require that the value be inserted in any particular way. As part of its structure, a service may enable the INSERT, UPDATE, and DELETE operations to identify specific locations where the operation is to be performed, for example, using an XPath expression.

Figure 12:
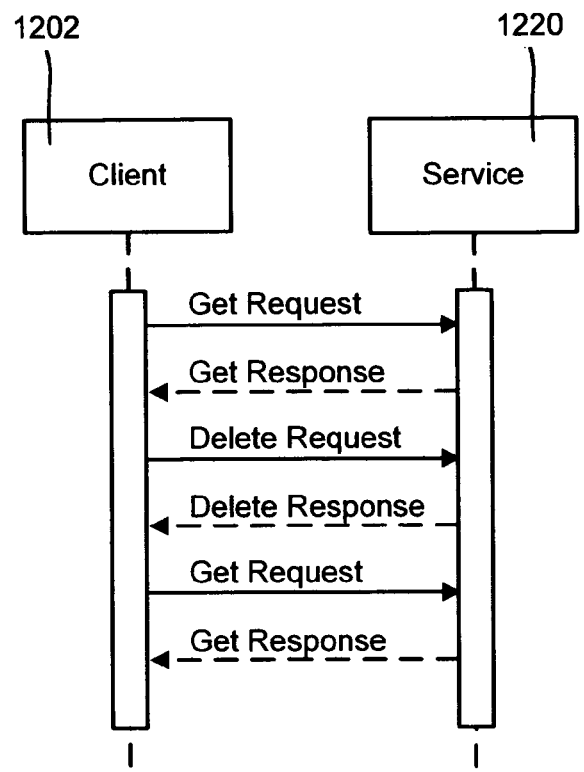
FIG. 12 is a sequence diagram showing a difference between a GET operation performed before and after a DELETE operation to demonstrate the result of the DELETE operation, in accordance with an aspect of the present invention.

As with an INSERT, the same general observation characteristics apply when the value of a service is modified using the DELETE operation, in which the part of the service value that is identified in the DELETE request is deleted. Assuming a service is being observed in isolation, the result of a DELETE operation can be detected by looking at the difference between a GET operation issued before the DELETE operation and a GET operation issued after the DELETE operation, as generally represented in FIG. 12.

The following table shows the properties for a DELETE operation:

| Property Sheet for DELETE | |
|---|---|
| Property | Value |
| MEP | Request-Response |
| Request Action | http://abc/def/ghij/10/wsap/deleterequest |
| Response Action | http://abc/def/ghij/10/wsap/deleteresponse |
| Safe | No |
| Idempotent | No |

A DELETE request is defined by the service; the response uses a convenience type defined for empty responses:

```
<M:MyServiceDeleteRequest
xmlns:M="http://www.example.org/myservice">
    <M:MyServiceEntries>
        <M:Entry>http://www.example.com/some/endpoint</M:Entry>
    <M:Entry>http://www.example.com/another/endpoint</M:Entry>
    </M:MyServiceEntries>
</M:MyServiceDeleteRequest>
```

```
<W:DefaultDeleteResponse
xmlns:W="http://abc/def/ghij/10/wsap.xsd"/>
```

Figure 13:
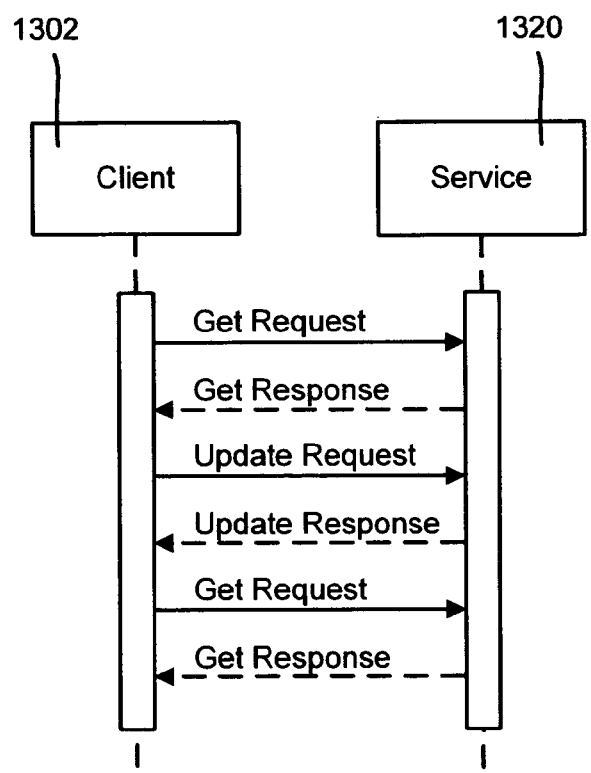
FIG. 13 is a sequence diagram showing a difference between a GET operation performed before and after an UPDATE operation to demonstrate the result of the UPDATE operation, in accordance with an aspect of the present invention.

When the value of a service is modified using the UPDATE operation, the part of the service value identified in the UPDATE request is replaced with the value included in the UPDATE request. Note that the UPDATE operation is similar to DELETE followed by INSERT if seen within a transaction context. That is, UPDATE succeeds only if the existing service value is successfully modified as described by the UPDATE operation. As with INSERT and DELETE, the result of an UPDATE operation can in isolation be detected by looking at the difference between a GET operation issued before the UPDATE operation and a GET operation issued after the UPDATE operation, as generally represented in FIG. 13.

The UPDATE operation is used to update existing value state, and has the following properties:

| Property Sheet for UPDATE | |
| --- | --- |
| Property | Value |
| MEP | Request-Response |
| Request Action | http://abc/def/ghij/10/wsap/updaterequest |
| Response Action | http://abc/def/ghij/10/wsap/updateresponse |
| Safe | No |
| Idempotent | No |

The following table contains the SOAP Body contents of a sample UPDATE operation. Both the request and the response verb are defined by WSAP; as with requests, the body of the SOAP envelope contains a service-defined response element.

In this example the response is a convenience type defined for empty responses. WSAP does not dictate the mechanism by which the existing state is identified, and instead leaves that up to the application. The following table describes example contents of an UPDATE request and response:

```
<M:MyServiceUpdateRequest
xmlns:M="http://www.example.org/myservice">
   <M:Replace>http://www.example.com/first/endpoint</M:Replace>
   <M:With>http://www.example.com/eight/endpoint</M:With>
</M:MyServiceUpdateRequest>
<W:DefaultUpdateResponse
xmlns:W="http://abc/def/ghij/10/wsap.xsd"/>
```

Another operation facilitated by WSAP involves replication, which provides a clean, transparent way of keeping states synchronized across distributed services. To this end, WSAP provides a replication model that enables a service to be synchronized with another service. To keep the state of the two services in synchronization, the replicated service performs the same operation or operations on the replicating service as are performed on the replicated service.

In general, REPLICATE, SUBSCRIBE, CANCELREPLICATE and UNSUBSCRIBE manipulate the state of subscriber lists. Since WSAP exposes state, subscriber lists may be kept in another WSAP service (e.g., a subscribeHelper). The main WSAP service sends Insert/Delete requests as appropriate upon receiving SUBSCRIBE, REPLICATE, CANCELREPLICATE and UNSUBSCRIBE requests. In the LOOKUP response on the main service, in the bindings, the helper is identified, which allows third parties to capture the entire state of the service. This, the entire state, including subscription lists, is visible if represented by a URI. Note that by separating subscriptions on their own state, a third party may notify subscribers of a service going away and being resurrected with a different URI.

Figure 14:
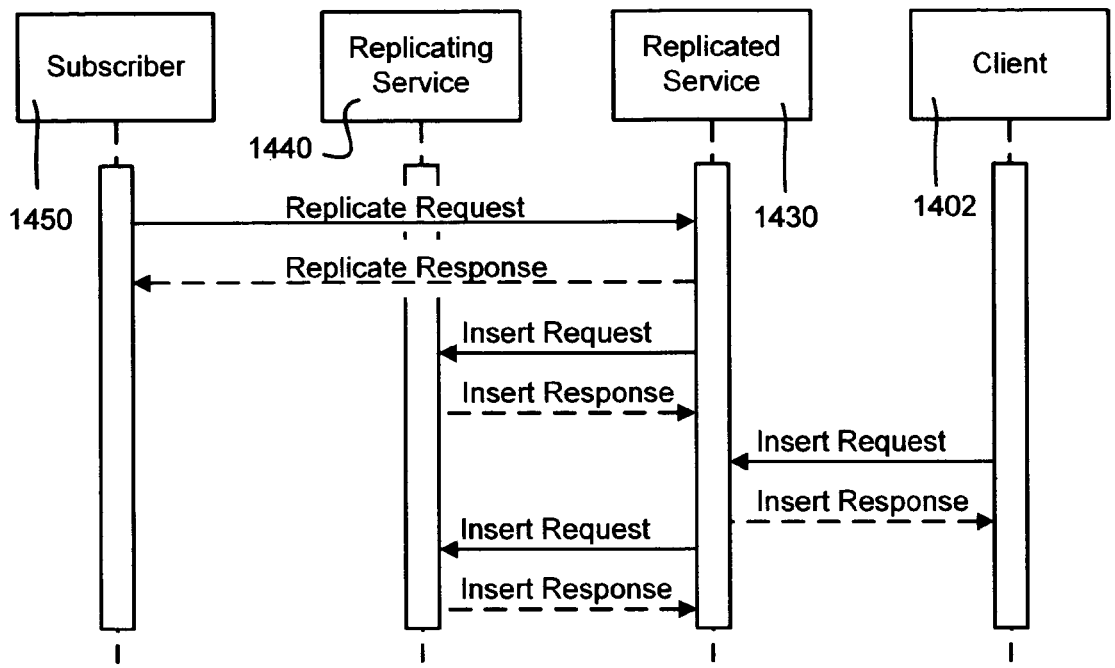
FIG. 14 is a block diagram generally representing an example REPLICATION sequence, in accordance with an aspect of the present invention.

As generally represented in FIG. 14, if an INSERT operation is performed on the replicated service 1430, based on a prior REPLICATE request from a subscriber 1450, the replicated service 1430 will perform an INSERT operation on the replicating service 1440. Note that the semantics of the WSAP replication model differ from the WSAP notification model (described below), which does not require the service to perform any action on receiving a NOTIFY message.

The REPLICATE operation can be used to replicate a service or part of a service. The behavior of the replication is described by a contract included in the request. The following table sets forth the properties for the REPLICATE operation:

| Property Sheet for REPLICATE | |
| --- | --- |
| Property | Value |
| MEP | Request-Response |
| Request Action | http://abc/def/ghij/10/wsap/replicaterequest |
| Response Action | http://abc/def/ghij/10/wsap/replicateresponse |
| Safe | No |
| Idempotent | Yes |

The following table sets forth contains the SOAP Body contents of a sample REPLICATE operation. The request is defined by WSAP; the response is defined by the service. In this example the response is a convenience type defined for empty responses:

```
<W:ReplicateRequest
xmlns:W="http://abc/def/ghij/10/wsap.xsd">
   <W:Contact>http://www.example.com/contracts/fullreplication</W:Contract>
</M:ReplicateRequest>
<W:DefaultReplicateResponse
xmlns:W="http://abc/def/ghij/10/wsap.xsd"/>
```

Replication is initiated by issuing a REPLICATE operation, which contains a contract that describes the replication model to be used. For example, the replicated service may support a replication model that only replicates state additions through the INSERT operation. If as in this example the replicating service is only interested in INSERT operations, it indicates so by referring to that replication contract in the REPLICATE operation. If the REPLICATE request is accepted, then the replicated service transfers its current state as a set of INSERT operations against the replicating service.

Note that as in FIG. 14, the subscribing service 1450 may be different from the replicating service 1440. In addition, the replicating service may already exist and have a certain state. Depending on the replication contract, this state may or may not be overridden when replication begins. In the above example where the replication contract only allows INSERT operations, then the replicated state will add to the existing state of the replicating service.

The replication contract may in some cases terminate by itself, the replication may be limited by an expiration time, or it may continue to replicate the state indefinitely. In one implementation, the expiration may be determined as part of the contract, however it alternatively may be provided as a value parameter.

Figure 15:
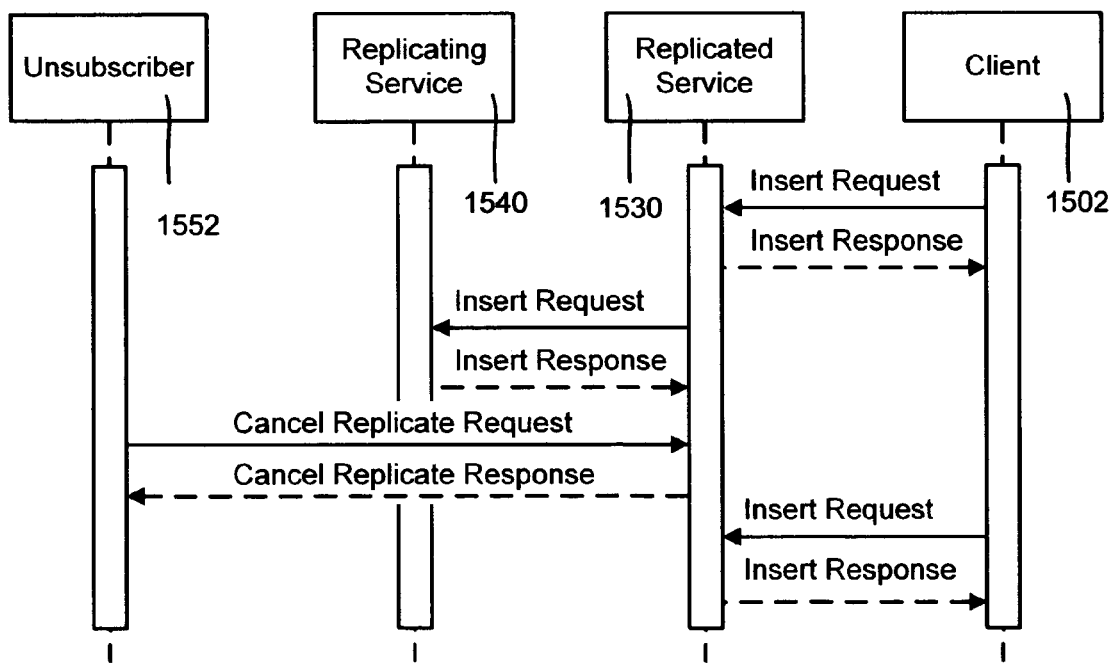
FIG. 15 is a block diagram generally representing an example CANCELREPLICATION sequence for canceling replication, in accordance with an aspect of the present invention.

The replication also may be explicitly terminated using the CANCELREPLICATION operation. A sample sequence diagram for the CANCELREPLICATION operation is shown in FIG. 15. As can be seen, the initial insert request from the client 1502 is received at the replicated service 1530 and replicated to the replicating service 1540. If an unsubscriber service 1552 requests a CANCELREPLICATE operation, the established replication is explicitly terminated. In the example of FIG. 15, no further insert requests from the client 1502 will be replicated by the replicated service 1530 to the replicating service 1540.

Property Sheet for CANCELREPLICATE

| Property | Value |
| --- | --- |
| MEP | Request-Response |
| Request Action | http://abc/def/ghij/10/wsap/cancelreplicaterequest |
| Response Action | http://abc/def/ghij/10/wsap/cancelreplicateresponse |
| Safe | No |
| Idempotent | No |

The following table contains the SOAP Body contents of a sample CANCELREPLICATE operation. The response uses a convenience type defined for empty responses:

```
<W:CancelReplicateRequest
    xmlns:W="http://abc/def/ghij/10/wsap.xsd"/>
<W:DefaultCancelReplicateResponse
    xmlns:W="http://abc/def/ghij/10/wsap.xsd"/>
```

In addition to the replication model, WSAP defines a simple event notification model that is based on a NOTIFY operation, which reports that a state change has occurred, but does not reveal the circumstance under which the state change occurred. Note that the semantics of the event notification model differ from the replication model, in which the replicating service changes state as a result of the messages sent from the replicated service. In the notification model, the subscriber is not required to perform any action upon receiving a NOTIFY message. As a result, any action the subscriber does take is based solely on its own semantics and not those of the event notification source. Note that NOTIFY operations are subscribed for and thus may expire, which may be part of the contract may be set via a value parameter.

The NOTIFY operation is part of the WSAP notification model, can be used to issue an event notification, and has the following properties:

Property Sheet for NOTIFY

| Property | Value |
| --- | --- |
| MEP | One-way |
| Request Action | http://abc/def/ghij/10/wsap/notify |
| Safe | Yes |
| Idempotent | Yes |

The follwing table contains the SOAP Body contents of a sample NOTIFY operation:

```
<M:MyNotification xmlns:M="http://www.example.org/myservice">
    <M:CurrentEntries>6</M:CurrentEntries>
</M:MyNotification>
```

Figure 16:
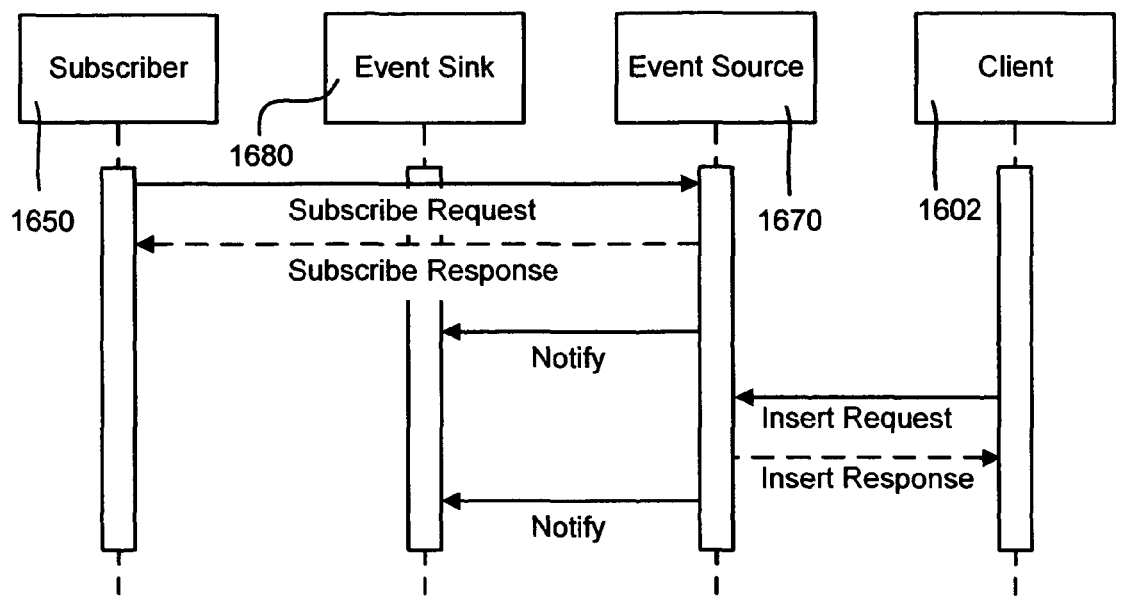
FIG. 16 is a block diagram generally representing an example SUBSCRIBE sequence to obtain event notification, in accordance with an aspect of the present invention.

FIG. 16 shows the SUBSCRIBE operation related to NOTIFY, in which a subscriber 1650 issues a request to an event source 1670. The request comprises a query that identifies the parts of the event notification source for which the subscriber is interested in seeing state changes. If the SUBSCRIBE operation is accepted, the event notification source 1670 initiates a NOTIFY operation that indicates the current state of the source. After this initial NOTIFY operation, the event notification source issues new NOTIFY operations whenever the state of the event notification source appropriately changes. Because the contract that describes the behavior of an event notification source is independent of the application semantics, it is entirely defined by WSAP.

The SUBSCRIBE operation thus is used to subscribe to changes in the state of a service, and has the following properties:

Property Sheet for SUBSCRIBE

| Property | Value |
| --- | --- |
| MEP | Request-Response |
| Request Action | http://abc/def/ghij/10/wsap/subscriberequest |
| Response Action | http://abc/def/ghij/10/wsap/subscriberesponse |
| Safe | No |
| Idempotent | No |

The following table contains the SOAP Body contents of a sample SUBSCRIBE operation. The request is defined by WSAP; the response is defined by the service. In this example the response is a convenience type defined for empty responses:

```
<M:MyServiceCurrentEntriesSubscribeRequest
    xmlns:M="http://www.example.org/myservice"/>
<W:DefaultSubscribeResponse
    xmlns:W="http://magnet/contracts/2003/10/wsap.xsd"/>
```

Figure 17:
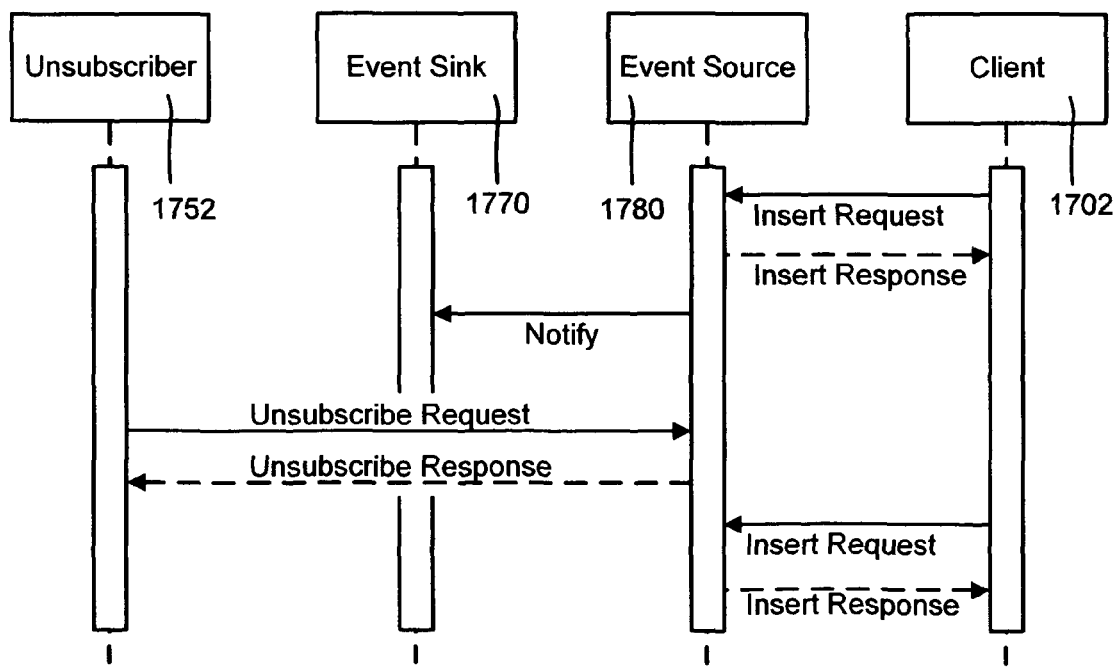
FIG. 17 is a block diagram generally representing an example UNSUBSCRIBE sequence, in accordance with an aspect of the present invention.

The subscription may be limited by an expiration time, similar to the replication model. Similarly, the subscription can be terminated at any time using an UNSUBSCRIBE operation, as represented in FIG. 17, wherein an unsubscriber 1752 sends and UNSUBSCRIBE operation to the event source to cancel further notifications.

The UNSUBSCRIBE operation that cancels a subscription has the following properties:

Property Sheet for UNSUBSCRIBE

| Property | Value |
| --- | --- |
| MEP | Request-Response |
| Request Action | http://abc/def/ghij/10/wsap/unsubscriberequest |
| Response Action | http://abc/def/ghij/10/wsap/unsubscriberesponse |
| Safe | No |
| Idempotent | No |

The following table contains the SOAP Body contents of a sample UNSUBSCRIBE operation. The request is defined by WSAP; the response is defined by the service. In this example the response is a convenience type defined for empty responses:

```
<W:UnsubscribeRequest
    xmlns:W="http://magnet/contracts/2003/10/wsap.xsd"/>
<W:DefaultUnsubscribeResponse
    xmlns:W="http://magnet/contracts/2003/10/wsap.xsd"/>
```

Note that the WSAP event notification model is a traditional push model wherein event notifications are pushed from the source to the sink. However, by using a buffering intermediary in the message path, it is possible to convert the push model into a pull model, which provides off-line support for event notification sinks.

Turning to a description of service termination, when a WSAP service is terminated, it no longer can send or receive messages of any type. A service may be terminated by having the behavior of the service describe a finite set of messages that the service can send or receive. When the service has fulfilled its contract, it terminates, and whatever resources it consumed can be recovered.

Figure 18:
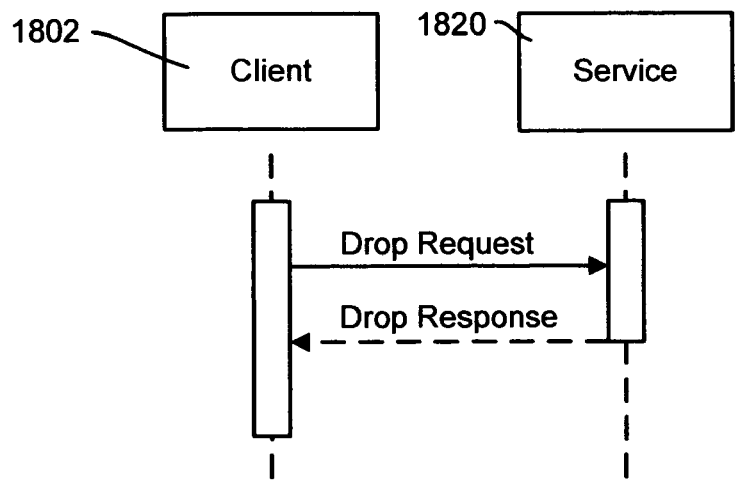
FIG. 18 is a block diagram generally representing an example of simple service termination, in accordance with an aspect of the present invention.

Additionally the behavior of a service may define an explicit interaction that forces the service to terminate. To this end, WSAP defines a DROP operation, whereby a service that accepts DROP as part of its contract may be explicitly terminated. As represented in FIG. 18, upon accepting the DROP operation from a service such as the client 1802, the targeted service 1820 simply ceases to send or receive any future messages. Similar to the CREATE operation, DROP can be simple as in FIG. 18, or complex, as described below with reference to FIG. 20.

The DROP operation has the following properties:

| Property Sheet for DROP | |
| --- | --- |
| Property | Value |
| MEP | Request-Response |
| Request Action | http://abc/def/ghij/10/wsap/droprequest |
| Response Action | http://abc/def/ghij/10/wsap/dropresponse |
| Safe | No |
| Idempotent | No |

The following table contains the SOAP Body contents of a sample DROP operation. The request is defined by WSAP; the response uses a convenience type defined for empty responses:

```
<W:DropRequest
    xmlns:M="http://magnet/contracts/2003/10/wsap.xsd"/>
<W:DefaultDropResponse
    xmlns:W="http://magnet/contracts/2003/10/wsap.xsd"/>
```

Note that it is feasible to have the behavior of a service allow an infinite amount of messages to be sent or received, and not allow an explicit operation that can terminate it, in which event the service cannot be terminated in a graceful manner. Further, note that there is no inherent relationship between the number of WSAP operations described and the lifetime of a service in elapsed clock time. It is recommended (but not required) that a service identifier not be recycled after termination of a service, to avoid obsolete references to the old service being applied to a new service of the same name.

Figure 19:
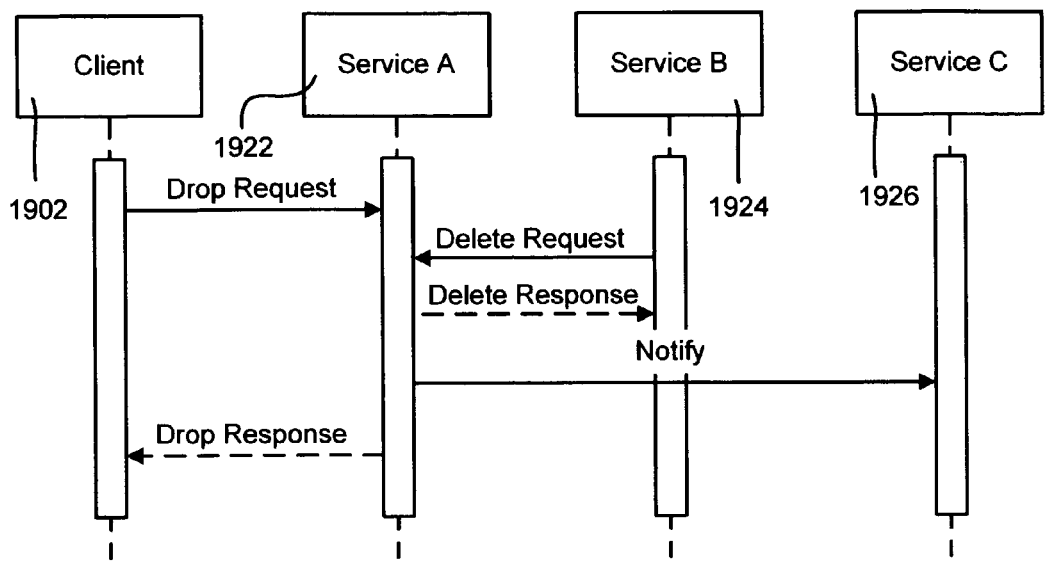
FIG. 19 is a block diagram generally representing an example of simple service termination with additional cleanup, in accordance with an aspect of the present invention.

In some cases, the targeted service may perform some additional cleanup such as unregistering from a directory service or sending out a final event notification. Such cleanup is performed before the DROP operation is completed, as represented by the DELETE request and NOTIFY operation in FIG. 19.

Figure 20:
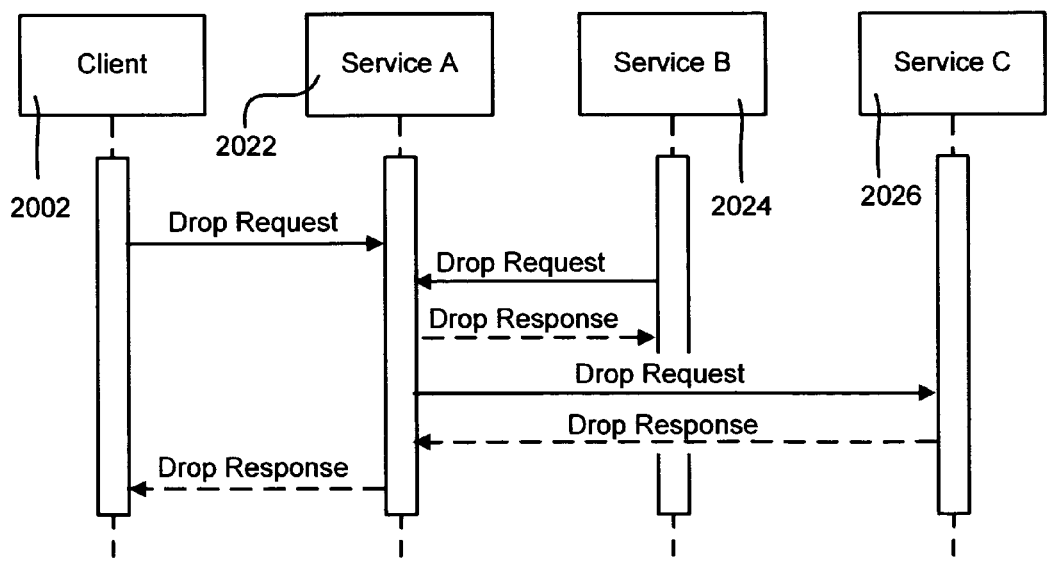
FIG. 20 is a block diagram generally representing an example of complex service termination, in accordance with an aspect of the present invention.

In a complex service termination, represented in FIG. 20, multiple related services are terminated as a set. This can happen if the relationship between the services is such that they cannot exist independently. In the case of complex service termination, WSAP provides no inherent guarantees that all services are terminated within a transaction context. Such guarantees can be provided by augmenting the behavior of the services with transaction support.

From the above commands, it can be seen that WSAP allows services to be restartable and dynamically load balanced, since it allows state at different sites to be captured and recreated. This can be used to implement transactions, load balance and or do live version updates to keep uptime to a maximum. By way of example, consider a service of type T, having URI A. Via the WSAP commands, another service can get data from A (e.g., via a GET request), look up A (e.g., via a LOOKUP request) to obtain its dependencies), and Drop A. Then, by creating a service of Type T having URI B, and performing a replace (e.g., DELETE and INSERT) on B, the result is the exact same state behavior, duplicated from where A was dropped.

As can be seen from the foregoing detailed description, there is provided a method and system and mechanism by which clients (services) and other web services communicate with a web service, including the entities that make up a service, in a manner that is efficient and secure, yet observable and reusable so that intermediaries may add value to the communication. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining that a web service provided by a web services provider provides a plurality of different behaviors, the web service being identified by a unique web service identifier, wherein each web service behavior is provided by a different logical entity and wherein each web service defines which requests it is configured to receive and in which order it is configured to receive the requests;
   assigning a separate data communication port to each of the plurality of different web service behaviors, the assigned data communication port being different than the web service identifier, wherein the data communication port allows a client to individually address and access the logical entities that provide each of the different web service behaviors separately, without addressing the web service identifier, and wherein the data communication ports maintain a list of ports including interaction between the ports, which provides an observable directory of what web service operations have occurred and in what order the operations occurred;

receiving a client request that requests web service functionality which utilizes at least two of the web service's behaviors; and returning assigned unique identifiers for each of the at least two web service behaviors in response to the client request, to allow the client to access each behavior separately using each behavior's assigned data communication port, wherein, based on the client request and based on the observable directory of what web service operations have occurred and in what order the operations occurred, multiple web services are run simultaneously in parallel.

2. The method of claim 1 further comprising returning a contract to the client that defines operations that the service is capable of handling.

3. The method of claim 2 wherein returning a contract to the client comprises providing an identifier of a document to the client.

4. The method of claim 2 further comprising providing a binding list to the client.

5. The method of claim 2 wherein the contract defines at least one operation from a set containing LOOKUP, CREATE, QUERY, INSERT, UPDATE, DELETE, GET, NOTIFY, REPLICATE, CANCELREPLICATE, SUBSCRIBE, UNSUBSCRIBE and DROP operations.

6. The method of claim 5 wherein a service implements at least two of the operations of the set in a defined order.

7. The method of claim 1 wherein assigning an identifier to each divergent behavior comprises assigning a URI to each divergent behavior.

8. The method of claim 1 further comprising, receiving a message from a client sent to an entity based on the assigned identifier.

9. The method of claim 8 wherein the entity comprises an intermediary, and further comprising, processing the message at the intermediary.

10. The method of claim 1 wherein one of the identifiers corresponds to a subscription list such that any subscription to the service has a separate state.

11. The method of claim 10 further comprising, notifying a subscriber on the subscription list.

12. The method of claim 10 further comprising, synchronizing another service by replicating data to a subscriber service on the subscription list.

13. The method of claim 10 further comprising modifying the state of a subscription list in response to at least one operation from a set containing REPLICATE, CANCELREPLICATE, SUBSCRIBE and UNSUBSCRIBE operations.

14. The method of claim 10 further comprising, maintaining the subscription list by communicating with a helper service.

15. The method of claim 14 further comprising providing a binding list to the client, wherein the helper service is identified in the binding list.

16. At least one computer-readable storage device having computer-executable instructions, which when executed perform the method of claim 1.

17. In a computing environment, a method comprising:

determining that a web service provided by a web services provider provides a plurality of different behaviors, the web service being identified by a unique web service identifier, wherein each web service behavior is provided by a different logical entity and wherein each web service defines which requests it is configured to receive and in which order it is configured to receive the requests;

assigning a separate data communication port to each of the plurality of different web service behaviors, the assigned data communication port being different than the web service identifier, wherein the data communication port allows a client to individually address and access the logical entities that provide each of the different web service behaviors separately, without addressing the web service identifier, and wherein the data communication ports maintain a list of ports including interaction between the ports, which provides an observable directory of what web service operations have occurred and in what order the operations occurred;

receiving, at a service, a request for a contract from a client, wherein the request requests web service functionality which utilizes at least two of the web service's behaviors;

providing an identifier of a contract document and an identifier of a binding list document in response to the request, the document containing contract information including a message ordering and a set of interaction points corresponding to behaviors of the service, and the binding list document containing service relationship information, such that the client can communicate directly with the logical entity within the web services provider that controls the requested behavior, wherein, based on the client request and based on the observable directory of what web service operations have occurred and in what order the operations occurred, multiple web services are run simultaneously in parallel.

18. The method of claim 17 wherein the binding list document contains an identifier of at least one helper service that maintains at least one subscription list for the service.

19. The method of claim 17 further comprising receiving a CREATE request at an interaction point.

20. The method of claim 17 further comprising receiving a QUERY request at an interaction point.

21. The method of claim 17 further comprising receiving a GET request at an interaction point.

22. The method of claim 17 further comprising receiving an INSERT request at an interaction point.

23. The method of claim 17 further comprising receiving a UPDATE request at an interaction point.

24. The method of claim 17 further comprising receiving a DELETE request at an interaction point.

25. The method of claim 17 further comprising receiving a DROP request at an interaction point.

26. The method of claim 17 further comprising receiving a notification at an interaction point.

27. The method of claim 17 further comprising receiving a request at an interaction point directed towards modifying a subscription list.

28. The method of claim 27 further comprising modifying the state of the subscription list in response to at least one operation from a set containing REPLICATE, CANCELREPLICATE, SUBSCRIBE and UNSUBSCRIBE operations.

29. The method of claim 28 wherein modifying the state of the subscription list includes communicating with a helper service.

30. At least one computer-readable storage device having computer-executable instructions, which when executed perform the method of claim 17.

* * * * *